(12) United States Patent
O'Connor et al.

(10) Patent No.: US 6,739,576 B2
(45) Date of Patent: May 25, 2004

(54) MICROFLUIDIC FLOW CONTROL DEVICE WITH FLOATING ELEMENT

(75) Inventors: Stephen D. O'Connor, Pasadena, CA (US); Eugene Dantsker, Pasadena, CA (US); Adrian Hightower, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 35 days.

(21) Appl. No.: 10/026,380

(22) Filed: Dec. 20, 2001

(65) Prior Publication Data

US 2003/0116738 A1 Jun. 26, 2003

(51) Int. Cl.⁷ .............................................. F16K 31/02
(52) U.S. Cl. ................ 251/129.14; 137/827; 251/30.02
(58) Field of Search ....................... 251/30.01–30.05, 251/129.01–129.22; 137/827

(56) References Cited

U.S. PATENT DOCUMENTS

| | | | |
|---|---|---|---|
| 1,318,545 A | * 10/1919 | Dehn ..................... 137/247.23 |
| 5,171,132 A | 12/1992 | Miyazaki et al. ........... 417/413 |
| 5,222,808 A | 6/1993 | Sugarman et al. .......... 366/274 |
| 5,250,263 A | 10/1993 | Manz .......................... 422/81 |
| 5,361,422 A | * 11/1994 | Vincent et al. ................. 4/213 |
| 5,585,069 A | 12/1996 | Zanzucchi et al. .......... 422/100 |
| 5,593,130 A | 1/1997 | Hansson et al. ............ 251/61.1 |
| 5,627,041 A | 5/1997 | Shartle ...................... 435/7.24 |
| 5,637,469 A | 6/1997 | Wilding et al. ............. 435/7.21 |
| 5,789,045 A | 8/1998 | Wapner et al. ............. 428/34.4 |
| 5,810,325 A | * 9/1998 | Carr ......................... 251/30.02 |
| 5,839,467 A | 11/1998 | Saaski et al. ................ 137/501 |
| 5,863,502 A | 1/1999 | Southgate et al. ............. 422/58 |
| 5,922,591 A | 7/1999 | Anderson et al. ......... 435/287.2 |
| 5,942,443 A | 8/1999 | Parce et al. ................. 436/514 |
| 5,955,029 A | 9/1999 | Wilding et al. ............ 422/68.1 |
| 5,964,408 A | * 10/1999 | Musson ........................ 251/35 |
| 5,971,355 A | 10/1999 | Biegelsen et al. ...... 251/129.06 |
| 5,992,820 A | * 11/1999 | Fare et al. .............. 251/129.01 |
| 6,033,191 A | 3/2000 | Kamper et al. ............. 417/322 |
| 6,068,751 A | 5/2000 | Neukermans ............... 204/601 |

(List continued on next page.)

FOREIGN PATENT DOCUMENTS

| | | | |
|---|---|---|---|
| EP | 1 123 734 | 8/2001 | ............ B01J/19/00 |
| WO | WO 99/19717 | 4/1999 | .......... G01N/25/22 |
| WO | WI 99/33559 | 7/1999 | ............ B01J/19/00 |
| WO | WO 99/60397 | 11/1999 | ......... G01N/33/483 |
| WO | WO 00/29770 | 5/2000 | |
| WO | WO 01/01025 | 1/2001 | ........... F16K/17/00 |
| WO | WO 02/01081 | 1/2002 | ............. F15C/3/00 |

OTHER PUBLICATIONS

Maghribi, Mariam N., et al., "Microsyringe Arrays In Poly (Dimethylesiloxane)," Micro Total Analysis Systems 2001 (Kluwer Academic Publishers), pp. 165–166, Oct. 21, 2001.

(List continued on next page.)

*Primary Examiner*—Paul J. Hirsch
(74) *Attorney, Agent, or Firm*—Vincent K. Gustafson; Michael F. Labbee

(57) ABSTRACT

A microfluidic flow control device includes a fluidic chamber, a first and a second microfluidic channel, at least one sealing surface between the first and the second channels, and a floating element disposed within the chamber. The floating element is capable of intermittently engaging the sealing surface, and movement of the floating element affects fluid flow between the first channel and the second channel. The floating element may be moved by fluid pressure, gravity, or an applied force such as a magnetic field. Multiple flow control regions may be integrated into a flow control system.

19 Claims, 15 Drawing Sheets

U.S. PATENT DOCUMENTS

| | | | | |
|---|---|---|---|---|
| 6,074,725 | A | 6/2000 | Kennedy | 428/188 |
| 6,074,827 | A | 6/2000 | Nelson et al. | 435/6 |
| 6,136,212 | A | 10/2000 | Mastrangelo et al. | 216/49 |
| 6,152,181 | A | 11/2000 | Wapner et al. | 137/807 |
| 6,408,878 | B2 | 6/2002 | Unger et al. | 137/597 |
| 6,415,821 | B2 | 7/2002 | Kamholz et al. | 137/827 |
| 6,461,323 | B2 * | 10/2002 | Fowler et al. | 604/67 |
| 6,669,909 | B2 * | 12/2003 | Shvets et al. | 422/100 |
| 2002/0194909 | A1 | 12/2002 | Hasselbrink et al. | 73/253 |

OTHER PUBLICATIONS

Rehm, J.E., et al., "Mobile Flow Control Elements For High–Pressure Micro–Analytical Systems Fabricated Using In–Situ Polymerization," Micro Total Analysis Systems 2001 (Kluwer Academic Publishers), pp. 227–229, Oct. 22, 2001.

Oh, Kwang W., et al., "In–Line Micro Ball Valve Through Polymer Tubing," Micro Total Analysis Systems 2001 (Kluwer Academic Publishers), pp. 407–408, Oct. 21, 2001.

Quake, Stephen R., et al., *From Micro– to Nanofabrication with Soft Materials*, "Science," vol. 290, (Science Magazine), pp. 1536–1540, Nov. 24, 2000.

Hecht, Jeff, *Fluid Switching –Optical networks won't need moving parts, just bubbles*, "New Scientist," Apr. 1, 2000, p. 10.

Shoji, Shuichi, *Fluids for Sensor Systems*, "Topics in Current Chemistry," vol. 194, (Springer Verlag Berlin Heidelberg), pp. 163–188, 1998.

Schomburg, W.K., et al, *AMANDA–low–cost production of microfluidic devices*, "Sensors and Acutators," A 70, (Elsevier Science S.A.), pp. 153–158, 1998.

Gravesen, Peter, et al., *Microfluidics–a review*, "J. Micromech. Microeng." 3 (IOP Publishing Ltd.), pp. 168–182, 1993.

* cited by examiner

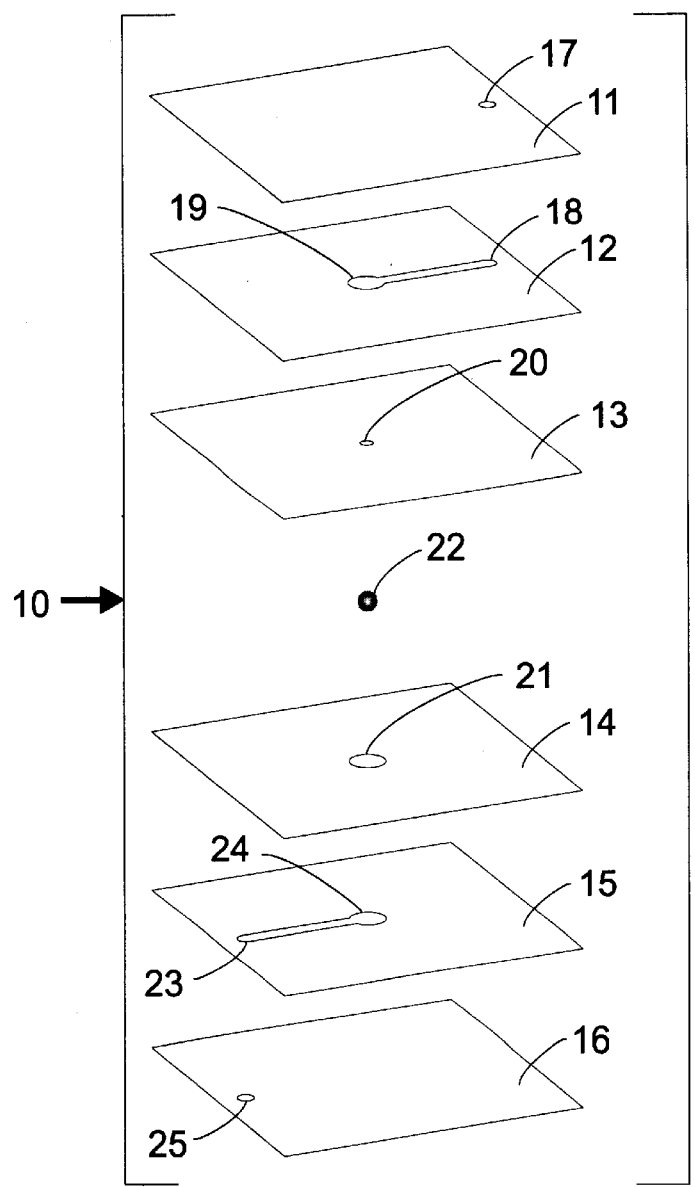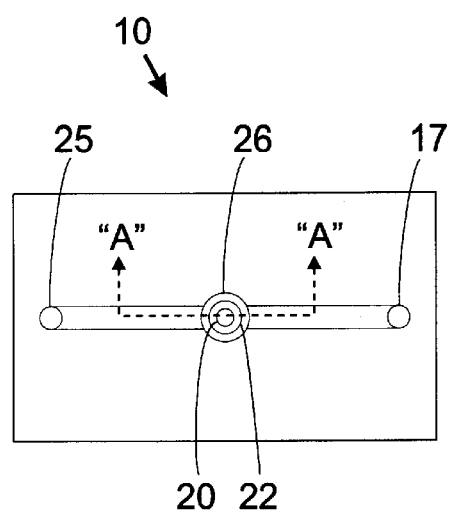
FIG._1A
FIG._1B

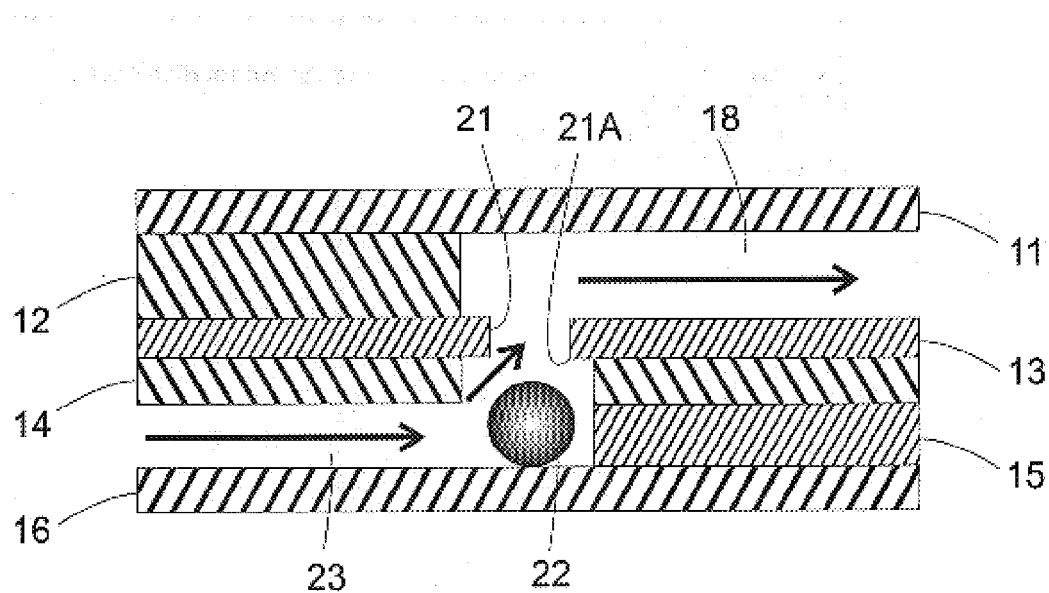
FIG._1C
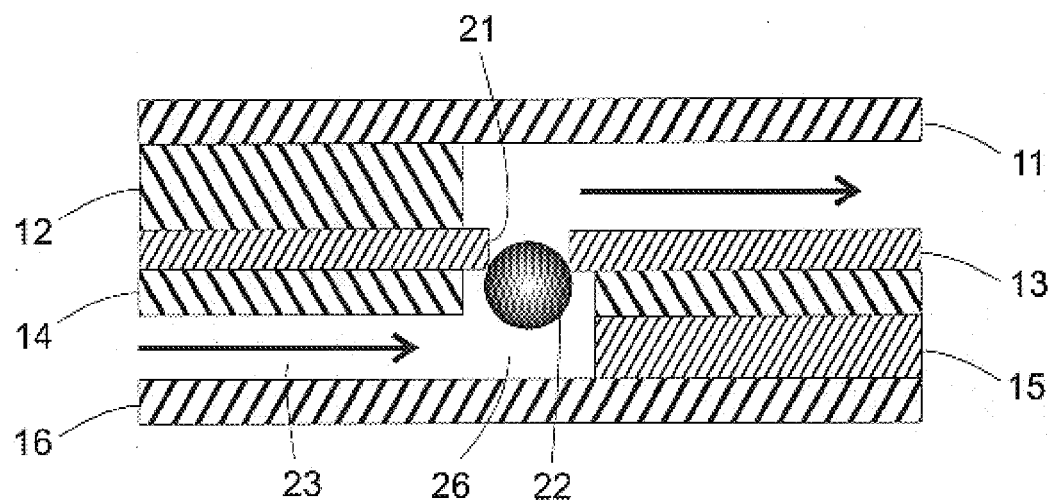
FIG._1D

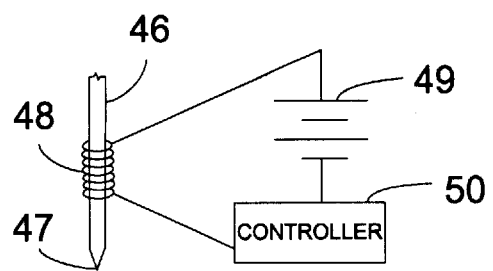
FIG._2A
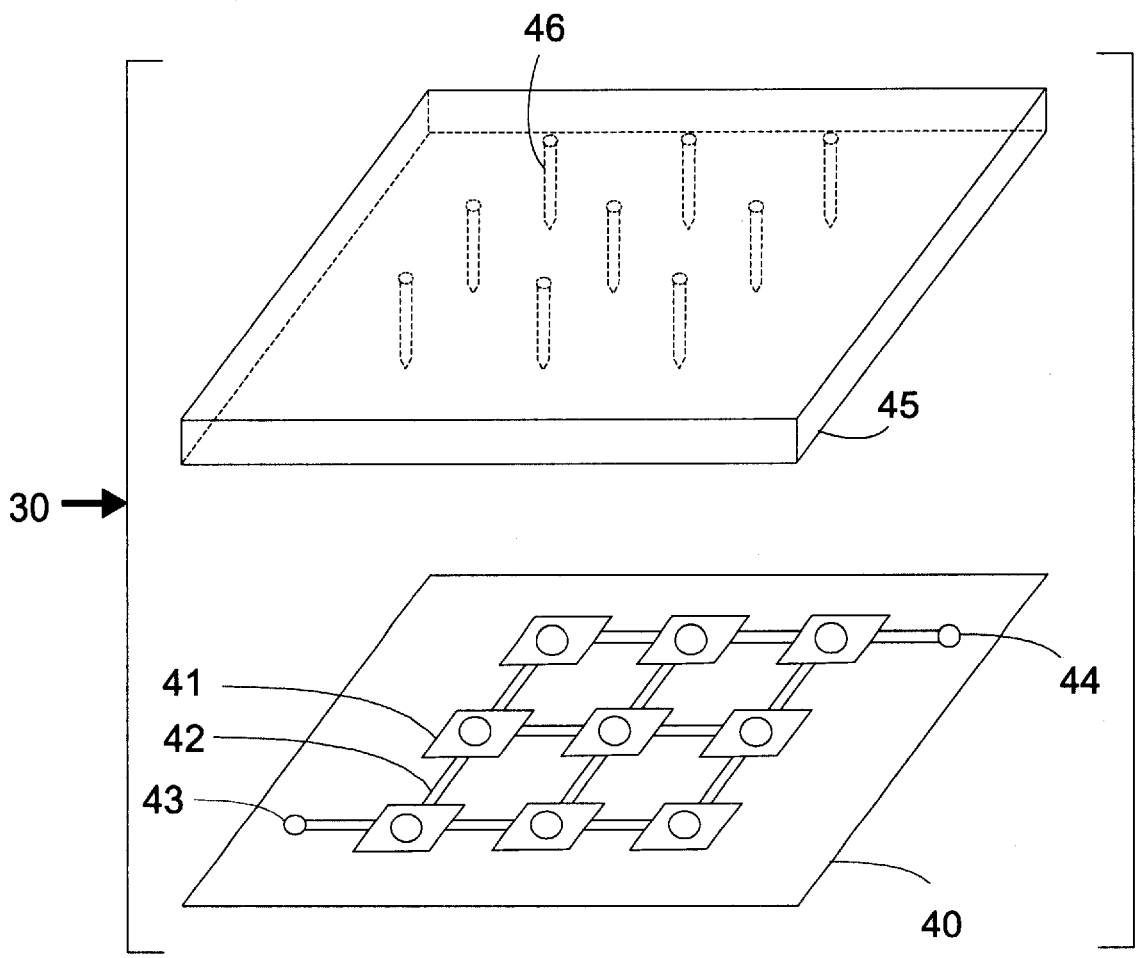
FIG._2B

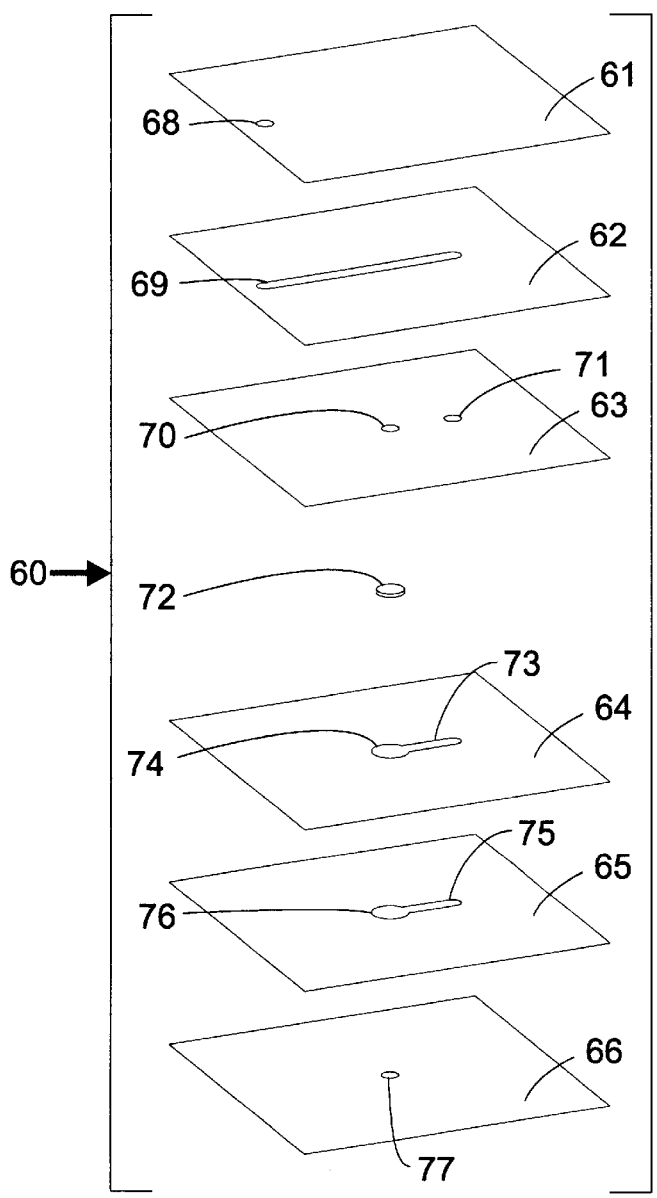
FIG._3A
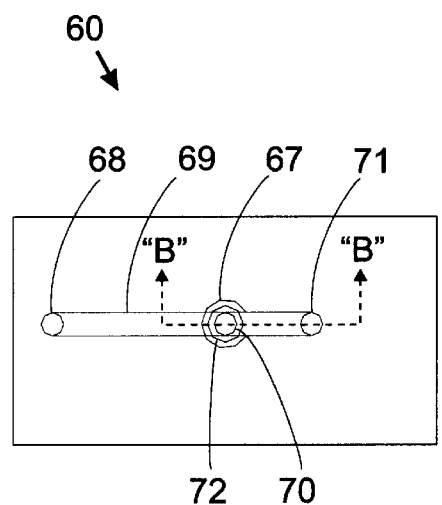
FIG._3B

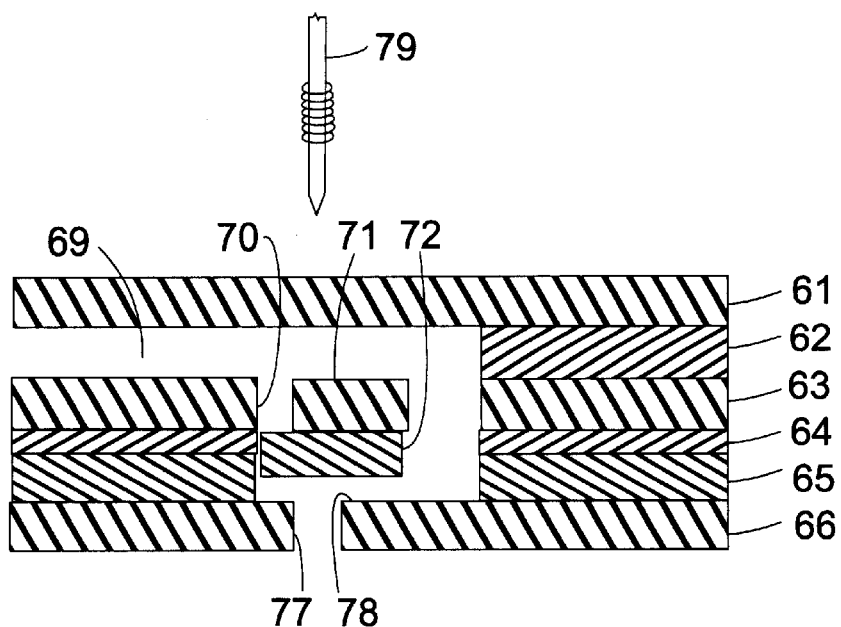
FIG._3C
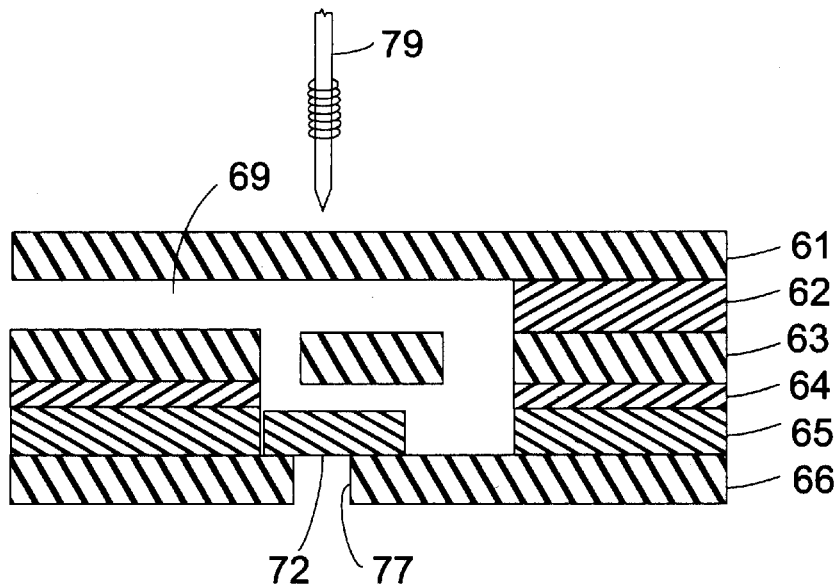
FIG._3D

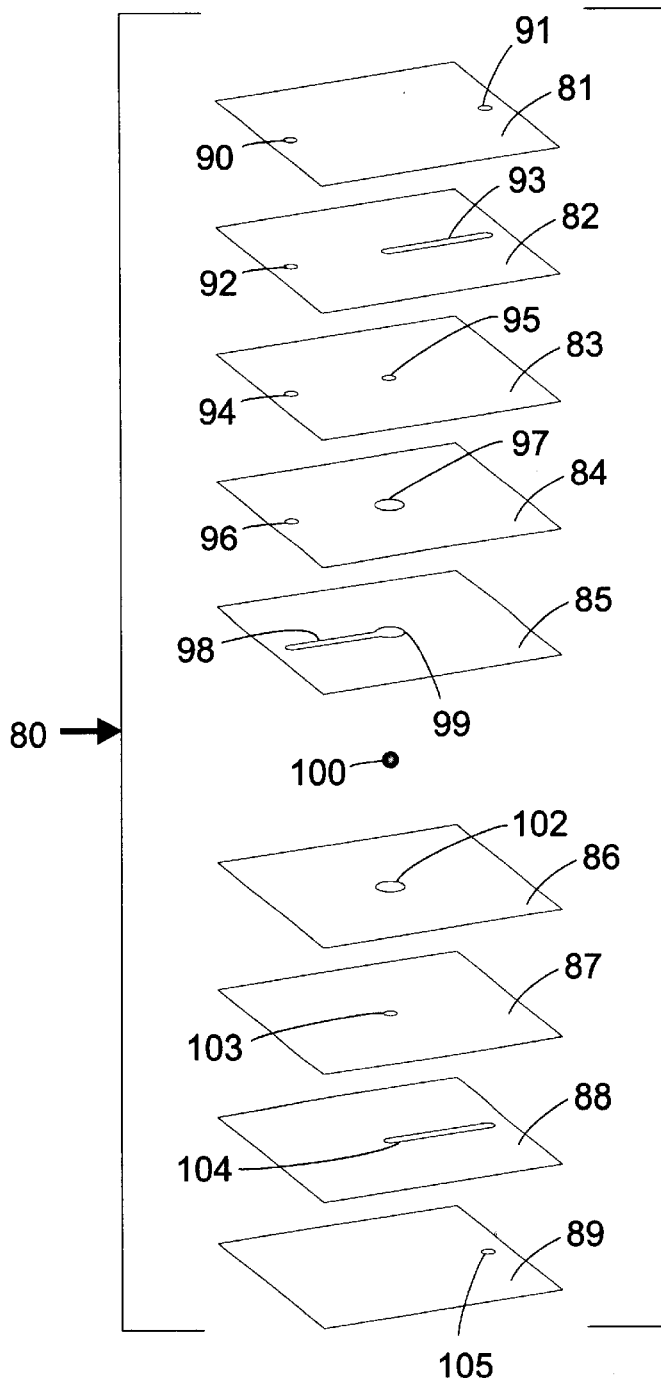
FIG._4A
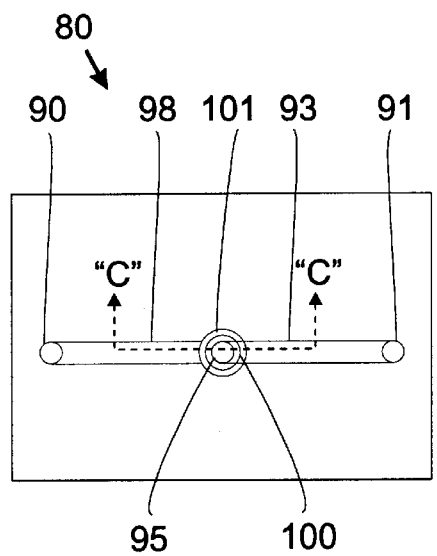
FIG._4B

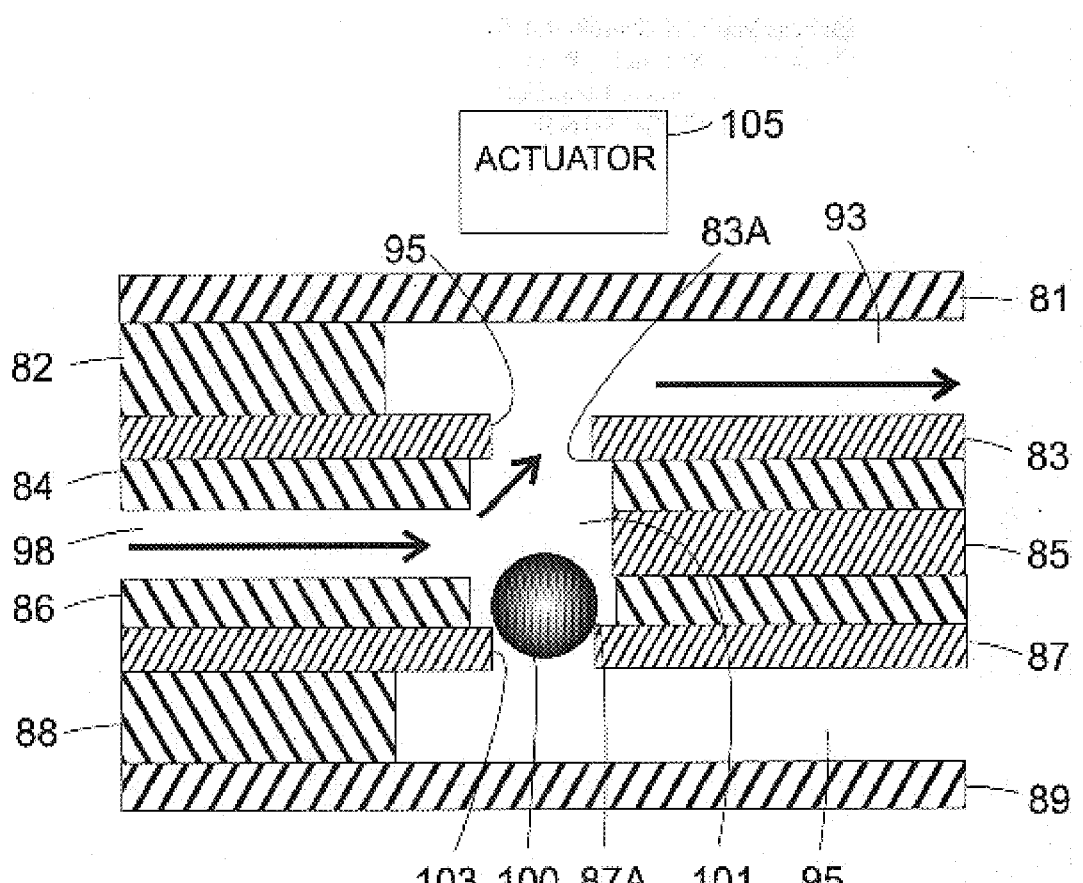
FIG._4C
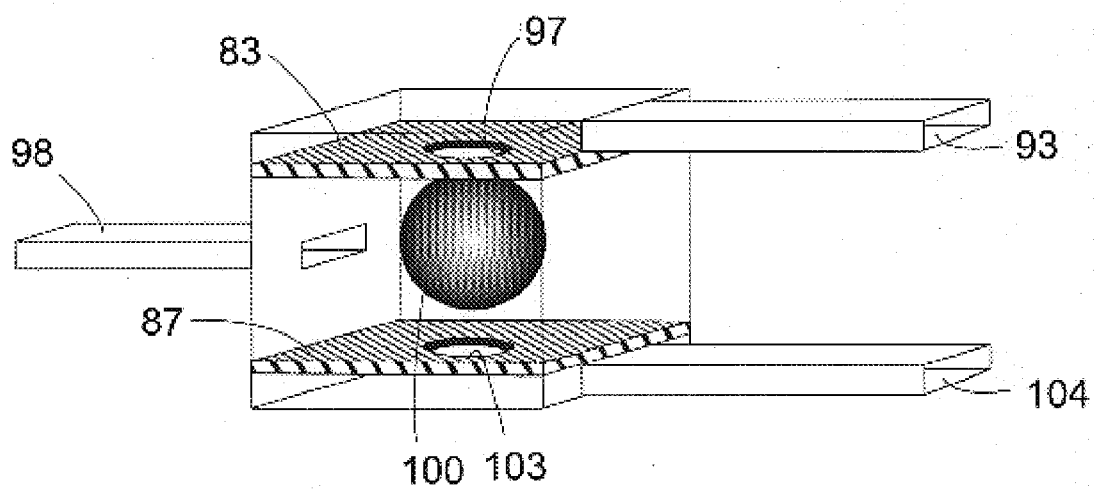
FIG._4D

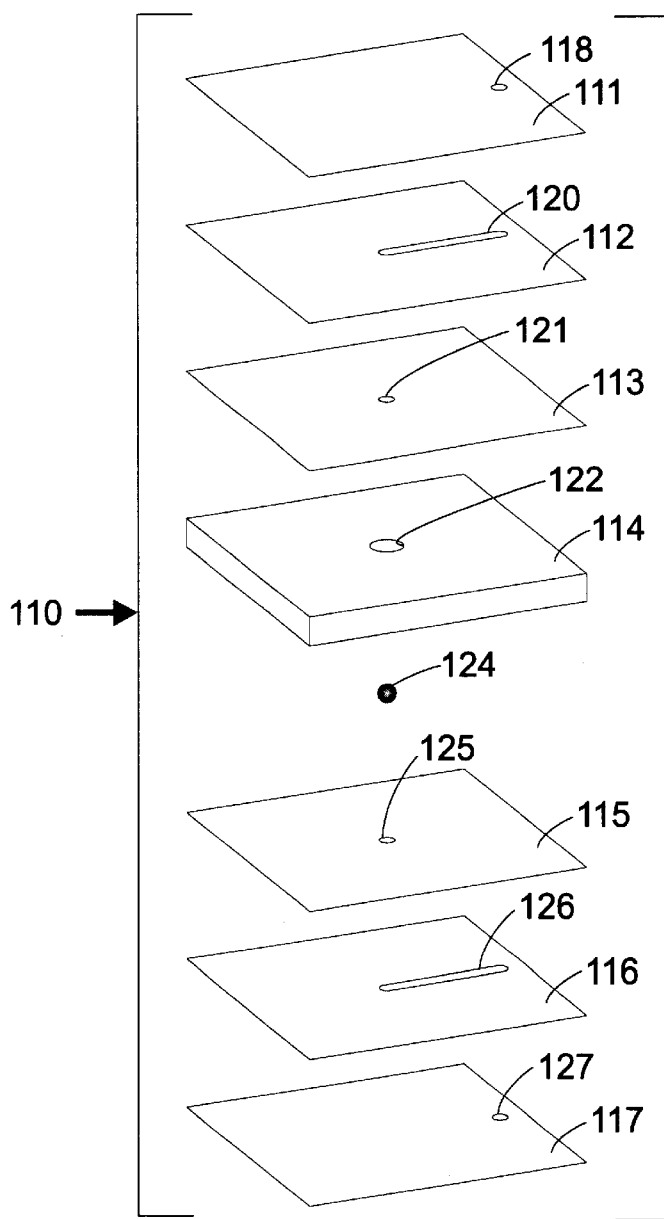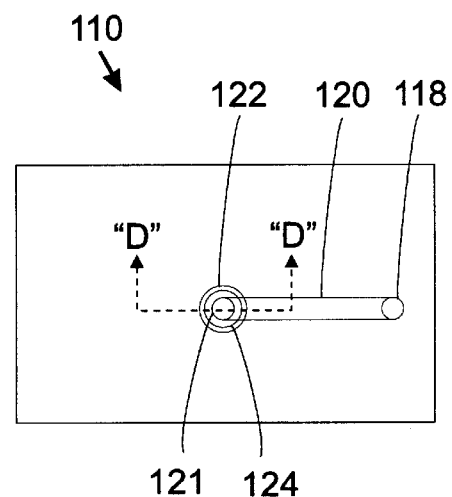
FIG._5A
FIG._5B

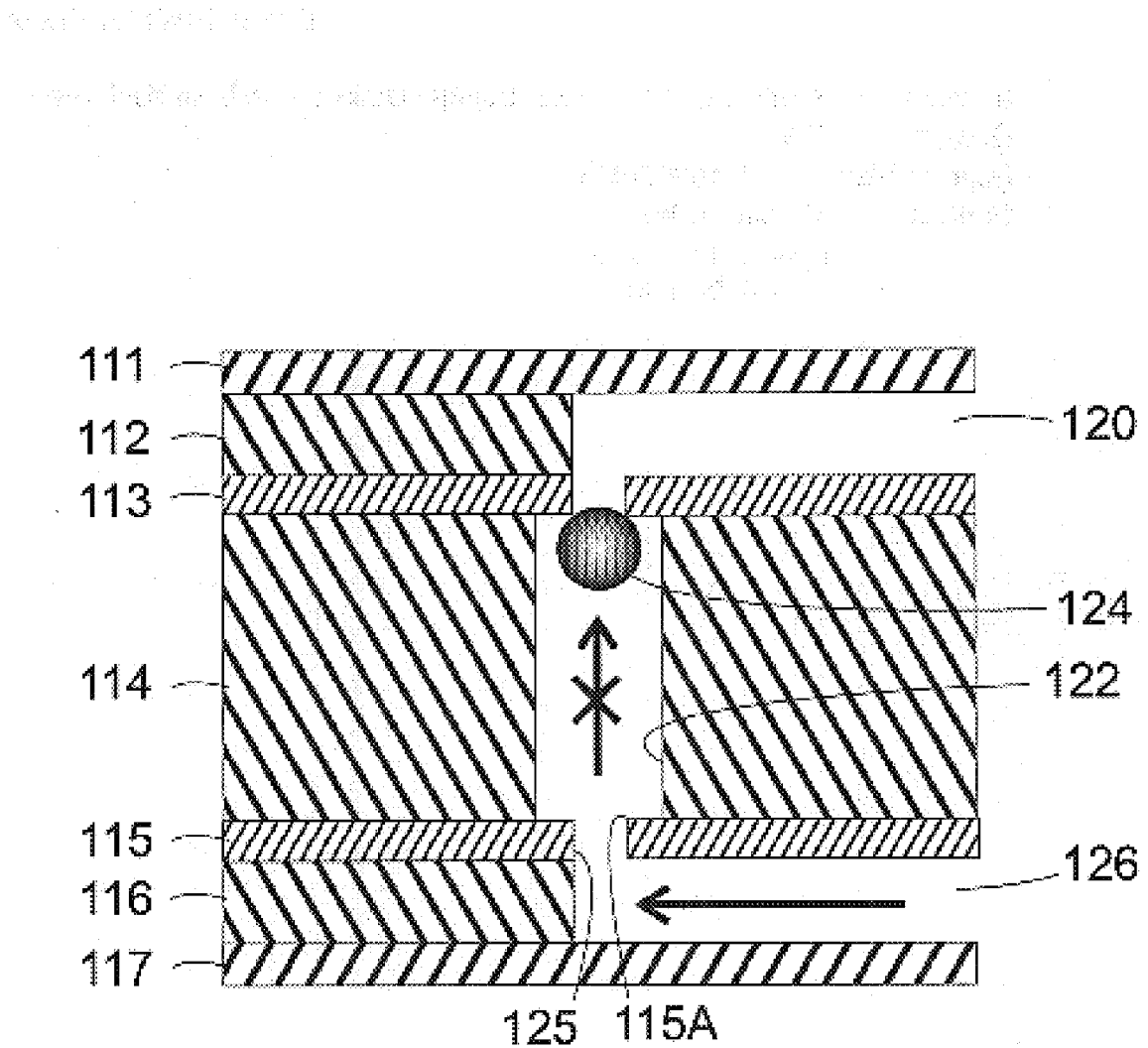
FIG._5E

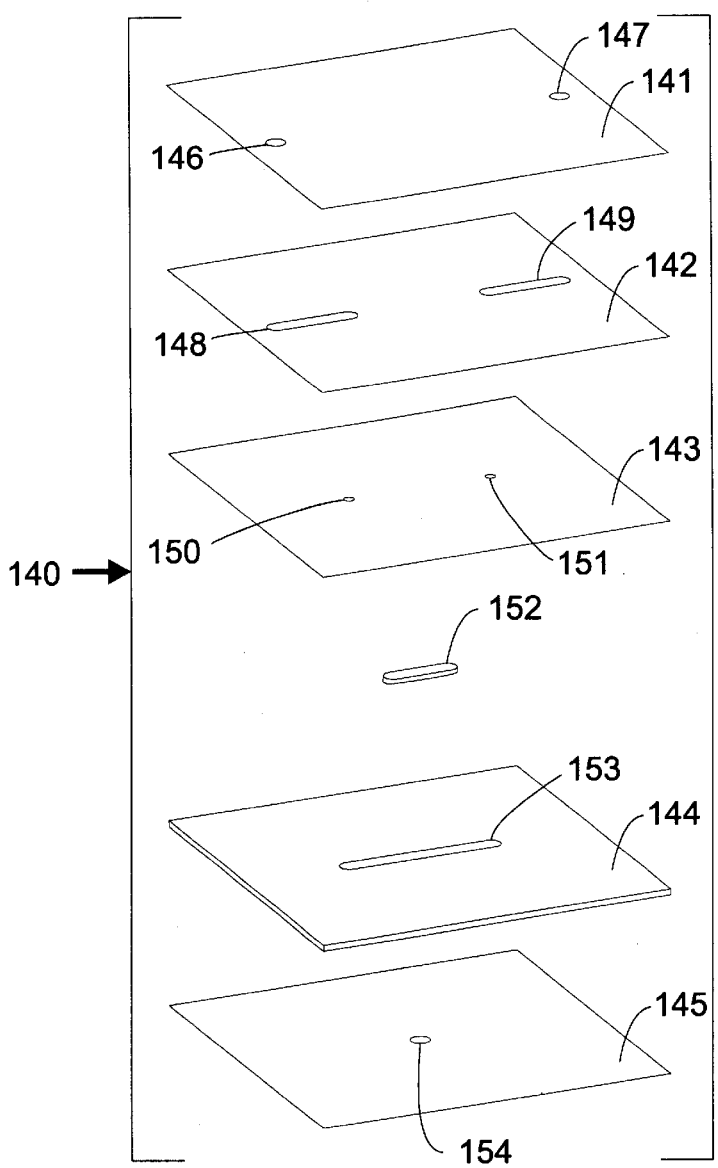
FIG._6A
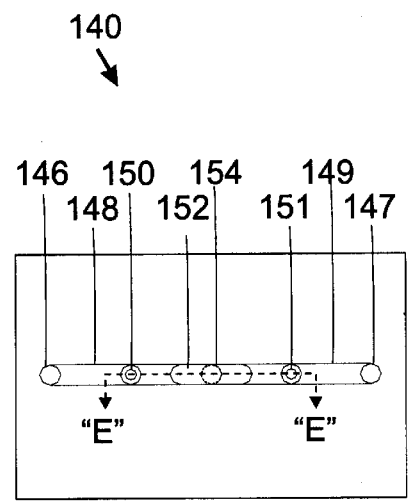
FIG._6B

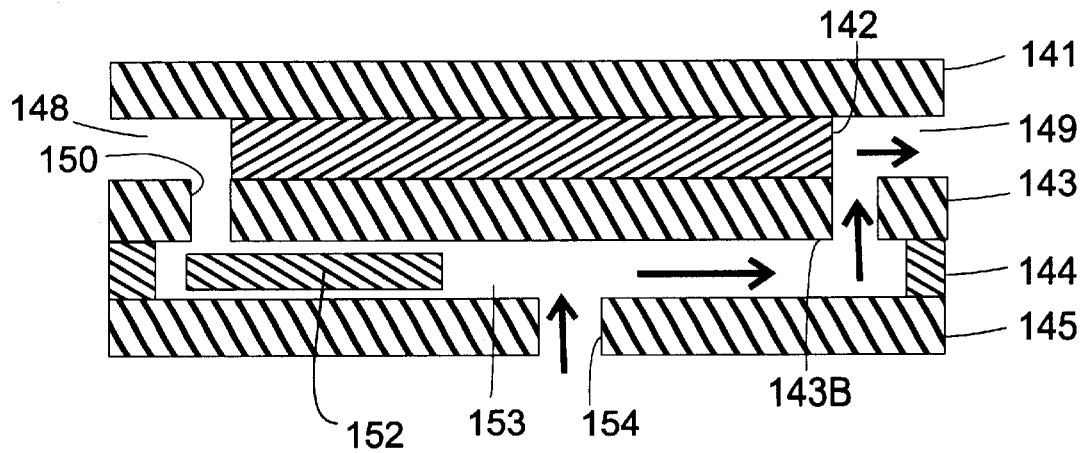
FIG._6C
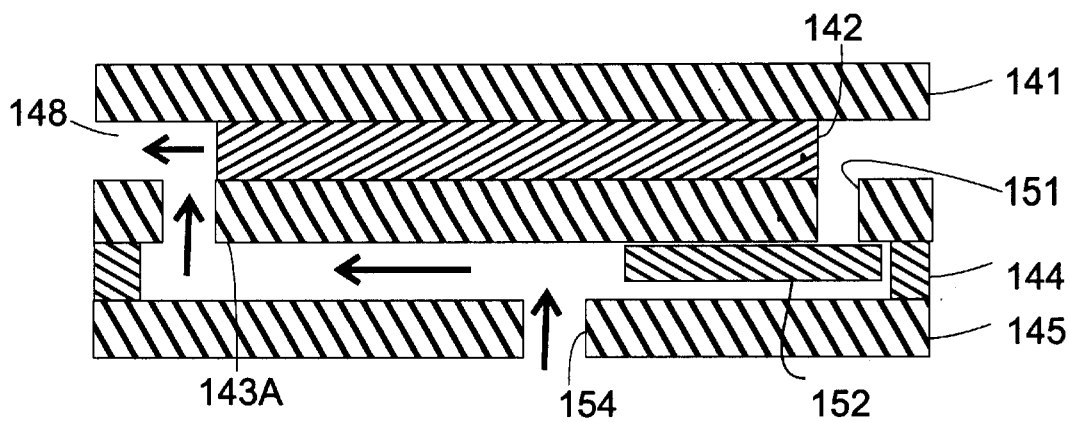
FIG._6D

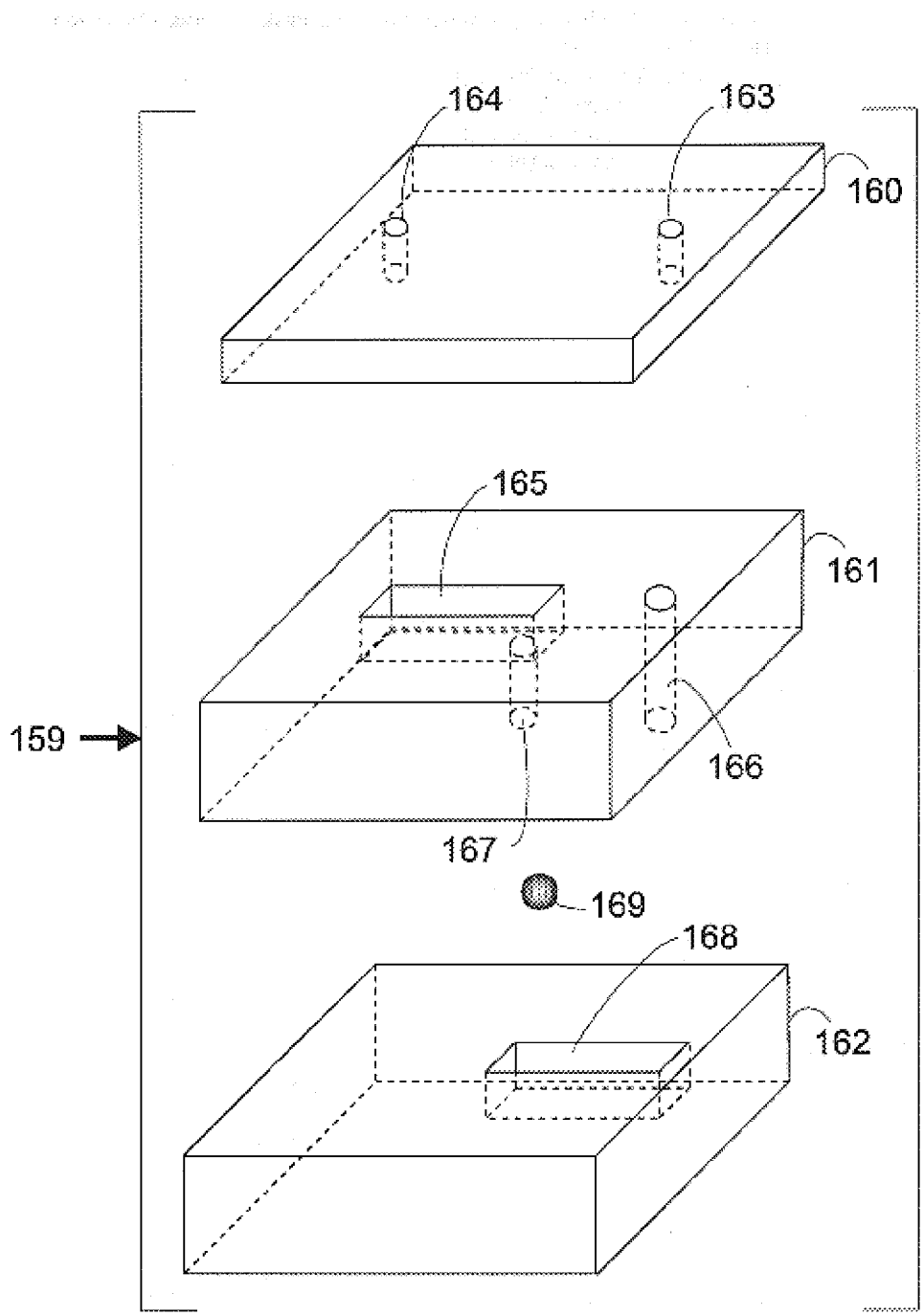
FIG._7A

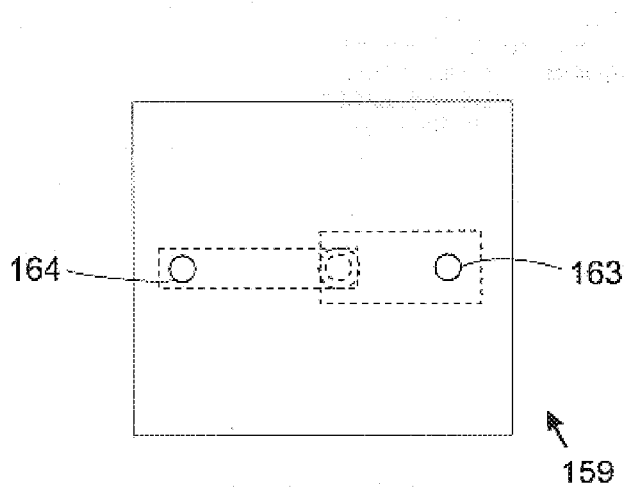
FIG._7B
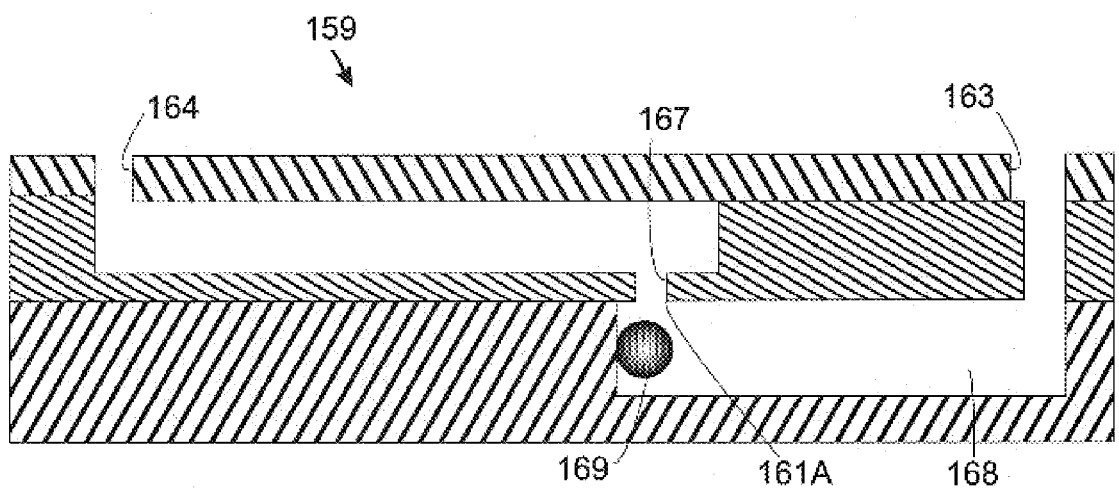
FIG._7C

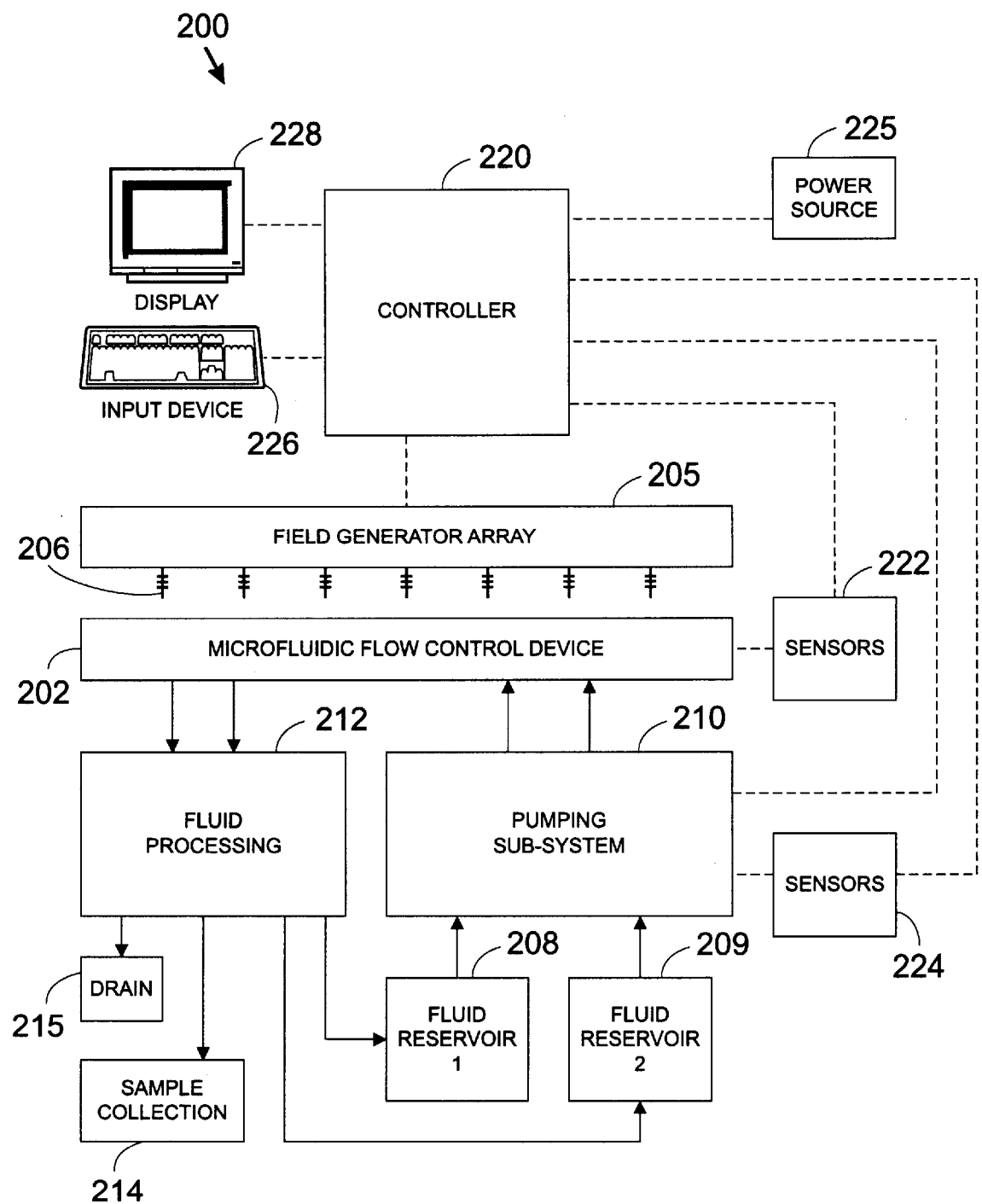
FIG._8

MICROFLUIDIC FLOW CONTROL DEVICE WITH FLOATING ELEMENT

FIELD OF THE INVENTION

The present invention relates to the control of fluid flow through microfluidic conduits.

BACKGROUND OF THE INVENTION

There has been a growing interest in the application of microfluidic systems to a variety of technical areas, including such diverse fields as biochemical analysis, medical diagnostics, chemical synthesis, and environmental monitoring. For example, use of microfluidic systems for the acquisition of chemical and biological information presents certain advantages. In particular, when conducted in microfluidic volumes, complicated biochemical reactions and processes may be carried out using very small volumes of fluid. In addition to minimizing sample volume, microfluidic systems increase the response time of reactions and reduce reagent consumption. Furthermore, when conducted in microfluidic volumes, a large number of complicated biochemical reactions and/or processes may be carried out in a small area, such as in a single integrated device. Examples of desirable applications for microfluidic technology include analytical chemistry; chemical and biological synthesis, DNA amplification; and screening of chemical and biological agents for activity, among others.

Traditional methods for constructing microfluidic devices have used surface micromachining techniques borrowed from the silicon fabrication industry. According to these techniques, microfluidic devices have been constructed in a planar fashion, typically covered with a glass or other cover material to enclose fluid channels. Representative devices are described, for example, in some early work by Manz, et al. (Trends in Anal. Chem. (1990) 10(5): 144–149; Advances in Chromatography (1993) 33: 1–66). These publications describe microfluidic devices constructed using photolithography to pattern channels on silicon or glass substrates, followed by application of surface etching techniques to remove material from a substrate to form channels. Thereafter, a cover plate is typically to the top of an etched substrate to enclose the channels and contain a flowing fluid.

More recently-developed methods permit microfluidic devices to be constructed from plastic, silicone or other polymeric materials. Fabrication methods include micromolding of plastics or silicone using surface-etched silicon as the mold material (see, e.g., Duffy et al., Anal. Chem. (1998) 70: 4974–4984; McCormick et al, Anal. Chem. (1997) 69: 2626–2630); injection-molding; and micromolding using a LIGA technique (see, e.g., Schomburg et al, Journal of Micromechanical Microengineering (1994) 4: 186–191), as developed at the Karolsruhe Nuclear Research Center in Germany and commercialized by MicroParts (Dortmund, Germany). LIGA and hot-embossing techniques have also been demonstrated by Jenoptik (Jena, Germany). Imprinting methods in polymethylmethacrylate (PMMA) have also been described (see, e.g., Martynova et al, Anal. Chem. (1997) 69: 4783–4789). These various techniques are typically used to fashion planar (ie., two dimensional, or 2-D) structures that require some sort of cover to enclose microfluidic channels.

Traditionally, fluid manipulation in these fluidic systems is controlled by electrokinetic and/or electrophoretic transport. These techniques involve the application of electric currents at very high voltages to control fluidic movement. Electrodes are placed within fluid channels and sufficient current and voltage is applied to cause the hydrolysis of water within the device. This hydrolysis produces a charge gradient through the channels that causes the movement of either the bulk fluid or molecules within the fluid. If sufficient electrodes and control components are provided, then such methods can be used to provide flow control within a microfluidic device. These techniques have numerous drawbacks, however, including the need for metallic electrodes within the chambers, and the connection of these electrodes to a high voltage source. Additionally, the hydrolysis of water is often accompanied by the formation of bubbles and other radicals that may have adverse effects on reactions within a microfluidic device or on the devices themselves. Accordingly, there is a need for microfluidic devices capable of providing flow control utility without requiring current and voltage to be applied directly to the fluid.

To enable complex fluid handling to be performed in microfluidic devices without applying current and voltage directly to a fluid, it is desirable to fabricate devices with integrated fluid control systems such as integrated valves and/or pumps. Generally, devices containing integrated valves or pumps are complex and difficult to manufacture. Fabrication of valve or pump structures using conventional methods can require the use of several different manufacturing techniques, thus rendering the fabrication process labor-intensive and time-consuming. This inhibits rapid development and optimization of new device designs. Additionally, tool-up costs for fabricating integrated microfluidic valve or pump structures using conventional techniques can be prohibitively high. In light of these limitations in conventional microfluidic devices, there is a clear need in the field of microfluidic devices for improved flow control devices.

SUMMARY OF THE INVENTION

In a first separate aspect of the invention, a microfluidic flow control device includes a fluidic chamber, a first and a second microfluidic channel, at least one sealing surface between the first and the second channels, and a floating element disposed within the chamber. The floating element is capable of intermittently engaging the sealing surface, and movement of the floating element affects fluid flow between the first channel and the second channel.

These and other aspects of the present invention will be apparent from the following detailed description of the preferred embodiments taken in conjunction with the figures.

BRIEF DESCRIPTION OF THE DRAWINGS

FIG. 1A is an exploded perspective view of a microfluidic flow control device fabricated from six layers, the device having an integral floating ball and a single potential fluid flow path. FIG. 1B is a top view of the assembled device of FIG. 1A. FIGS. 1C–1D are side sectional views of a portion of the microfluidic flow control device illustrated in FIGS. 1A–1B along section lines "A"—"A" showing two different operational states of the device.

FIG. 2A is a schematic view of a magnetic actuator having a field-concentrating element and a related circuit. FIG. 2B is an exploded perspective schematic view of a magnetically actuated microfluidic flow control system having multiple microfluidic flow control elements actuated with an array of magnetic actuators.

FIG. 3A is an exploded perspective view of a microfluidic flow control device fabricated from six layers and having an integral floating disk. FIG. 3B is a top view of the assembled device of FIG. 3A. FIGS. 3C–3D are side sectional views of a portion of the microfluidic flow control device of FIGS. 3A–3B along section lines "B"—"B" showing two different operational states of the device.

FIG. 4A is an exploded perspective view of a microfluidic flow control device fabricated from six layers, the device having an integral floating ball and multiple potential fluid flow paths. FIG. 4B is a top view of the assembled device of FIG. 4A. FIG. 4C is a side sectional view of a portion of the microfluidic flow control device illustrated in FIGS. 4A–4B along section lines "C"—"C". FIG. 4D is a schematic perspective sketch of selected microstructures defined by the device of FIGS. 4A–4C.

FIG. 5A is an exploded perspective view of a microfluidic flow control device fabricated from seven layers, the device having an integral floating ball. FIG. 4B is a top view of the assembled device of FIG. 4A. FIGS. 5C–5E are side sectional views of a portion of the microfluidic flow control device illustrated in FIGS. 5A–5B along section lines "D"—"D" showing three different operational states of the device.

FIG. 6A is an exploded perspective view of a microfluidic flow control device fabricated from five layers, the device having an integral elongated floating element. FIG. 6B is a top view of the assembled device of FIG. 6A. FIGS. 6C–6D are side sectional views of a portion of the microfluidic flow control device illustrated in FIGS. 6A–6B along section lines "E"—"E" showing two different operational states of the device.

FIG. 7A is an exploded perspective view of a microfluidic flow control device fabricated from three layers using conventional surface micromachining techniques. FIG. 7B is a top view of the assembled device of FIG. 7A. FIG. 7C is a side sectional view of the device illustrated in FIGS. 7A–7B.

FIG. 8 is a schematic illustration of a microfluidic flow control system showing interconnections between various components including a microfluidic flow control device, a magnetic field generator array, and a controller, among others.

DETAILED DESCRIPTION OF PREFERRED EMBODIMENTS OF THE INVENTION

Definitions

Figure 5C:
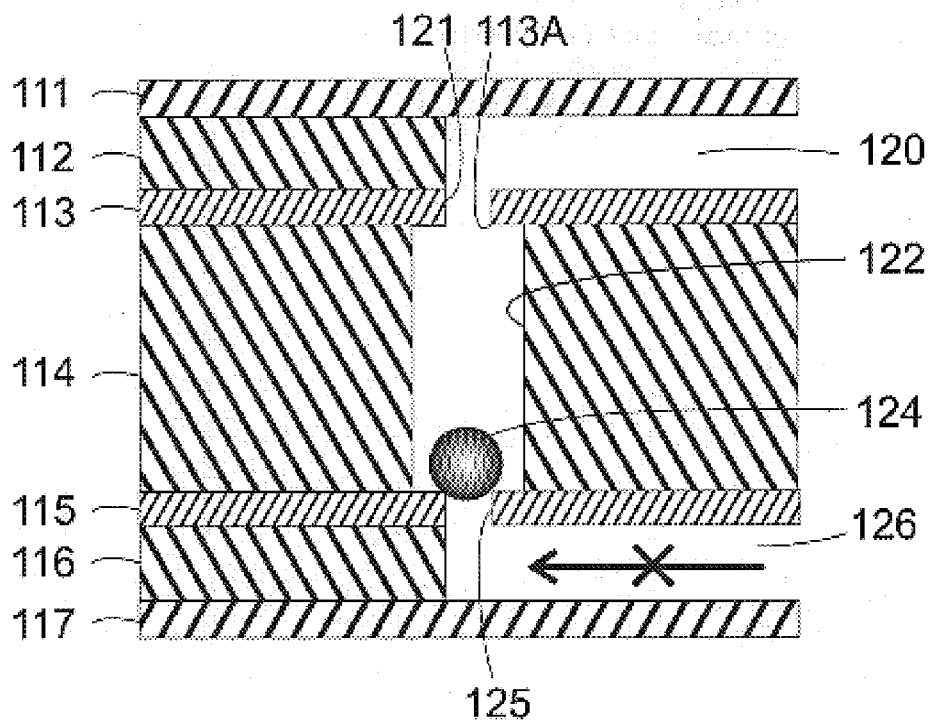

The terms "channel" and "chamber" as used herein are to be interpreted in a broad sense. Thus, the terms are not intended to be restricted to elongated configurations where the transverse or longitudinal dimension greatly exceeds the diameter or cross-sectional dimension. Rather, the terms are meant to include cavities or conduits of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. A "channel" or, more preferably, a "chamber" according to the present invention may contain a floating element for affecting fluid flow.

The term "floating element" as used herein refers to an element that: (1) is contained within, but not attached to, a microstructure such as a channel or chamber; (2) is capable of substantial movement within the microstructure, such that it may intermittently contact (and preferably seal against) a sealing surface; and (3) permits substantial fluid flow through the microstructure when the element is not in contact with the sealing surface. A floating element is preferably suspended in or supported by a fluid, and this suspension or support may be provided by either a static or flowing fluid. Movement of the floating element may be motivated by fluid flow or by the application of an external force, such as, for example, a magnetic field.

The term "microfluidic" as used herein is to be understood, without any restriction thereto, to refer to structures or devices through which fluid(s) are capable of being passed or directed, wherein one or more of the dimensions is less than 500 microns.

The term "sealing surface" as used herein refers to a surface intended to engage or otherwise mate with a floating element. Sealing surfaces may be provided in various geometries or configurations.

The term "stencil" as used herein refers to a material layer or sheet that is preferably substantially planar, through which one or more variously shaped and oriented channels and/or chambers have been cut or otherwise removed through the entire thickness of the layer, thus permitting substantial fluid movement within the layer (as opposed to simple through-holes for transmitting fluid through one layer to another layer). The outlines of the cut or otherwise removed portions form the lateral boundaries of microstructures that are completed when a stencil is sandwiched between other layers, such as substrates and/or other stencils.

The term "substantially sealed" as used herein refers to a microstructure having a sufficiently low unintended leakage rate and/or volume under given flow, fluid identity, and pressure conditions. The term also encompasses microstructures that have one or more fluidic ports or apertures to provide fluid inlet or outlet utility.

The term "via" as used herein refers to an aperture of hole connecting one or more fluidic channels or chambers within a microfluidic device.

Fabrication of Microfluidic Structures

In an especially preferred embodiment, microfluidic devices according to the present invention are constructed using stencil layers or sheets to define channels and/or chambers. As described in further detail in co-pending U.S. application Ser. No. 09/453,029, a stencil layer is preferably substantially planar and has a channel or chamber cut through the entire thickness of the layer. For example, a computer-controlled plotter modified to manipulate a cutting blade may be used. Such a blade may be used either to cut sections to be detached and removed from the stencil layer, or to fashion slits that separate regions in the stencil layer without removing any material. Alternatively, a computer-controlled laser cutter may be used to cut patterns through the entire thickness of a material layer. While laser cutting may be used to yield precisely-dimensioned microstructures, the use of a laser to cut a stencil layer inherently removes some material. Further examples of methods that may be employed to form stencil layers include conventional stamping or die-cutting technologies. Any of the above-mentioned methods for cutting through a stencil layer or sheet permits robust devices to be fabricated quickly and inexpensively compared to conventional surface micromachining or material deposition techniques used by others to produce fluidic microstructures.

After a portion of a stencil layer is cut or removed, the outlines of the cut or otherwise removed portions form the lateral boundaries of microstructures that are completed upon sandwiching a stencil between substrates and/or other stencils. The thickness or height of the microstructures such as channels or chambers can be varied by altering the thickness of the stencil layer, or by using multiple substantially identical stencil layers stacked on top of one another. When assembled in a microfluidic device, the top and bottom surfaces of stencil layers are intended to mate with one or more adjacent stencil or substrate layers to form a substantially sealed device, typically having one or more fluid inlet ports and one or more fluid outlet ports.

The wide variety of materials that may be used to fabricate microfluidic devices using sandwiched stencil layers include polymeric, metallic, and/or composite materials, to name a few.

When assembled in a microfluidic device, the top and bottom surfaces of stencil layers may mate with one or more adjacent stencil or substrate layers to form a substantially sealed device. In one embodiment, one or more layers of a device may be fabricated from single- or double-sided adhesive tape, although other methods of adhering stencil layers may be used. A portion of the tape (of the desired shape and dimensions) can be cut and removed to form channels, chambers, and/or apertures. A tape stencil can then be placed on a supporting substrate with an appropriate cover layer, between layers of tape, or between layers of other materials. In one embodiment, stencil layers can be stacked on each other. In this embodiment, the thickness or height of the channels within a particular stencil layer can be varied by varying the thickness of the stencil layer (e.g., the tape carrier and the adhesive material thereon) or by using multiple substantially identical stencil layers stacked on top of one another. Various types of tape may be used with such an embodiment. Suitable tape carrier materials include but are not limited to polyesters, polycarbonates, polytetrafluoroethlyenes, polypropylenes, and polyimides. Such tapes may have various methods of curing, including curing by pressure, temperature, or chemical or optical interaction. The thicknesses of these carrier materials and adhesives may be varied.

Notably, stencil-based fabrication methods enable very rapid fabrication of devices, both for prototyping and for high-volume production. Rapid prototyping is invaluable for trying and optimizing new device designs, since designs may be quickly implemented, tested, and (if necessary) modified and further tested to achieve a desired result. The ability to prototype devices quickly with stencil fabrication methods also permits many different variants of a particular design to be tested and evaluated concurrently.

In another preferred embodiment, microfluidic devices according to the present invention are fabricated from materials such as glass, silicon, silicon nitride, quartz, or similar materials. Various conventional machining or micromachining techniques such as those known in the semiconductor industry may be used to fashion channels, vias, and/or chambers in these materials. For example, techniques including wet or dry etching and laser ablation may be used. Using such techniques, channels chambers, and/or apertures may be made into one or more surfaces of a material or penetrate through a material.

Still further embodiments may be fabricated from various materials using well-known techniques such as embossing, stamping, molding, and soft lithography.

In addition to the use of adhesives or single- or double-sided tape discussed above, other techniques may be used to attach one or more of the various layers of microfluidic devices useful with the present invention, as would be recognized by one of ordinary skill in attaching materials. For example, attachment techniques including thermal, chemical, or light-activated bonding; mechanical attachment (such as using clamps or screws to apply pressure to the layers); or other equivalent coupling methods may be used.
Providing Flow Control Utility with a Floating Element Certain embodiments according to the present invention are directed to a microfluidic flow control device or valve that permits rapid control of a fluid within a microfluidic system. Such a microfluidic device may be active (e.g., utilizing an externally applied actuating force) or passive (e.g., responding to flow of a primary fluid). For example, flow control devices according to various embodiments may be activated using one or more external actuating mechanisms or may act in response to a changing pressure gradient within a microfluidic circuit.

In a preferred embodiment, a microfluidic device defines a network of fluidic channels and a fluid cavity (such as a chamber) in fluid communication with the network, wherein the cavity contains a floating element. The floating element is not attached to the surrounding microstructure, such that it is capable of substantial movement within the cavity. The floating element may intermittently contact, and preferably seal against, a sealing surface. However, when the floating element is not contacting the sealing surface, then substantial flow through the surrounding cavity (and related fluidic network) is permitted.

A floating element for use with a flow control according to the present invention may be fashioned in various sizes and shapes. Generally, a floating element has dimensions smaller than portions of the fluidic cavity where it is contained so that it can freely move within the cavity. In certain embodiments, the floating element is dimensionally smaller than certain portions of the microfluidic cavity, but is larger than other portions of the cavity, so that fluid movement within the device can be constricted or stopped once the floating element is moved to certain positions. Movement of a floating element may merely inhibit or reduce fluid flow without completely blocking it.

A floating element may be provided in various shapes. In certain embodiments, a floating element is substantially spherical or hemispherical in shape. When provided in such a shape, the spherical portion of the floating element can mate with a sealing surface defining appropriately sized circular via or "through hole" within the device and make a good fluidic seal to stop fluid flow. In other embodiments, the valve structure can be non-spherical, and provided in disc-like, cubic, or regular prismatic shapes, among others. Still further shapes are possible, such as pyramidal, conical, etc.

In a preferred embodiment, actuation means are provided to move a floating element within a cavity, thus altering fluid flow capability through a microfluidic network. Movement of a floating element may be motivated by external actuation means such as application of a magnetic field, may be motivated by a internal means such as a pressure gradient between a fluid cavity and another region, or may be caused by a combination of mechanisms. A floating element may be moved to a desired position by fluid flow within a microfluidic device. For instance, valves external to a microfluidic device can be used to produce local changes in pressure within a microfluidic structure to cause a floating element to move. In certain embodiments, a floating element operates to block fluid flow, such as by engaging a sealing surface defining an aperture (e.g., a via) in a fluid flow path to prevent fluid flow therethrough. In other embodiments, a floating element operates to reduce fluid flow.

An aperture or via defined in a sealing surface can have any appropriate shape and size. In a preferred embodiment, when complete blockage of fluid flow is desired, such a via is substantially circular in shape and a floating element for mating with the sealing surface along the via is substantially spherical in shape.

In certain embodiments, a floating element blocks or inhibits fluid flow when in an un-activated position. In other embodiments, a floating element serves to block or inhibit fluid flow when in an activated position.

In one embodiment, a floating element can be moved into various positions to divert at least a portion of a bulk fluid flow from one flow path to another flow path. For example, an microfluidic channel network can be provided with one inlet channel and multiple outlet channels all in fluid communication with a microfluidic chamber. A floating element disposed within the chamber may be moved to selectively block one or more outlet channels.

While various activation mechanisms may be employed to move a floating element within a microfluidic device, a preferred embodiment utilizes magnetic actuation. In such an embodiment, a floating element is composed of a magnetic material or magnetizable material, and an external magnetic field is applied to move the floating element. Generally, magnetic actuation requires a field generator and a magnetic (ie., paramagnetic or ferromagnetic) element. A magnetic element moves in response to application of a magnetic field, with the direction of motion of the magnetic element depending on the direction of the applied magnetic field. Opening or closing force of a structure such as a magnetically actuated valve may be adjusted by varying the magnitude of the applied magnetic field, or selecting a magnetic element with appropriate response characteristics (e.g., magnetization). For example, if strong magnetization is desirable, then magnetic elements formed from rare earth magnetic materials may be used.

In one embodiment, a flow control device includes one or more magnetic or magnetizable floating elements, and an associated magnetic field generator external to the flow control device includes one or more small permanent magnets that may be brought into close proximity with the device to induce movement of the floating element(s). The external permanent magnets may be connected to moveable piston-like structures to control their movement, and the motion of these moveable structures may be electronically controlled.

In an especially preferred embodiment, a magnetic field generator is electromagnetic. An electromagnetic field generator typically includes a coil of current-carrying wire, preferably insulated wire. Current may selectively applied to the coil, such as by using an external current source, to generate a magnetic field. The strength of the magnetic field may be adjusted by varying the magnitude of the current and the number of turns of wire. The direction of the resulting magnetic field is parallel to the central axis of the coil. In a more preferred embodiment, a field-concentrating element, such as a ferromagnetic core, is provided along the central axis of the coil. A magnetic field generator 46 having a field-concentrating element 47 and a coil of insulated wire 48 are shown in FIG. 2A. The field-concentrating element 47 is preferably substantially cylindrical in shape, and if a highly focused field is desired then the cylinder should be of a small diameter. The current-carrying wire 48 may be directly wrapped around the field-concentrating element 47. A voltage source 49 and controller 50 are preferably provided to power the field generator 46.

In another embodiment, a floating element may be moved within a fluidic device using an optical mechanism, such as external laser tweezers. As would be appreciated by one skilled in the art, multiple laser beams can be focused on a particle or object such that movement of the focal point exerts a force capable of translating such an object. Such an embodiment would require a microfluidic device to be constructed with optically transmissive materials along at least one surface. In other embodiments, a floating element may be moved by pressure applied to one or more channels. In other embodiments, the pressure is a result of fluid movement within the channel network. In another embodiment, gravity can substantially affect movement of a floating element.

In a preferred embodiment, a microfluidic flow control device having an integral floating element is fabricated using sandwiched stencil layers. For example, referring to FIGS. 1A–1D, a microfluidic flow control device 10 may be fabricated in six device layers 11–16. The first layer 11 defines a first fluidic port 17 in fluid communication with a channel 18 defined in the second stencil layer 12. The channel 18 has an enlarged chamber region 19 disposed above a small aperture 20 in the third layer 20. The fourth layer 14 defines a large aperture 21 disposed above an enlarged chamber region 24 defined in the fifth stencil layer 15. The fifth layer 15 further defines a channel 23 leading to the enlarged chamber region 24. The sixth layer 16 defines a second fluidic port 25. A floating element 22 may be placed into the large aperture 21, and the six layers 11–16 may be joined together to form a substantially sealed device 10.

The combined volume of the large aperture 21 and the enlarged chamber region 24 serves as a chamber 26 for containing a floating element 22. The illustrated floating element 22 is substantially spherical in shape. To permit substantial movement of the floating element 22, the height of the chamber 26 (i.e., the combined thickness of the fourth and fifth layers 14, 15) is greater than the diameter of the floating element 22, and the aperture 21 and enlarged chamber region 24 are each larger in diameter than the floating element 22. Additionally, the diameter of the small aperture 20 is preferably smaller than the diameter of the floating element 22 to permit sealing engagement between the floating element 22 and the third layer 13 along a sealing surface 21A. That is, a portion of the floating element 22 can fit into the small aperture 20 and form a seal against the sealing surface 21A.

The six layers 11–16 of the device 10 may be formed of various materials. To provide one example: the first and third layers 11, 13 may be fabricated from 2-mil (50 microns) thick polypropylene film; the second and fourth stencil layers 12, 14 may be fabricated from 5.4 mil (135 microns) thick double-sided tape comprising a 1 mil (2.5 microns) polyester carrier and 2.2 mil (27 microns) thick acrylic adhesive on each side; the fifth layer 15 may be fabricated from 6.8 mil (170 microns) thick single-sided tape comprising a 5 mil (125 microns) polyethylene carrier and 1.8 mil (45 microns) thickness acrylic adhesive; and the sixth layer 16 may be fabricated from a substrate such as polycarbonate, polypropylene, or acrylic of convenient dimensions. As discussed previously, the floating element 22 should be smaller in diameter than the combined thickness of the fourth and fifth layers 14, 15 (e.g., 12.2 mils, or 305 microns) that form a cavity or chamber surrounding the floating element 22, but larger in diameter than the small aperture 21. Therefore, an appropriate size for the floating element or bead would be approximately 10 mils (250 microns) in diameter, and the small via 20 can be approximately 5-mils (125 microns) in diameter. In an alternative embodiment, the fourth layer 14 can be composed of several stacked layers to achieve a desired (greater) thickness. In such an instance, a larger floating element 22 could be used, with appropriate attention to possibly resizing the small aperture 20, the large aperture 21, and the enlarged chamber region 24.

As noted previously, floating elements may be fabricated in various sizes and shapes from various materials. Where it is desirable to provide a robust seal, the floating element is preferably fabricated from non-porous materials that will not permit fluid migration therethrough. Examples of such material include: glass, metals, and crystalline minerals. In an especially preferred embodiment, a floating element is spherical in shape. "Microspheres" of appropriate dimensions and numerous different materials, including magnetic materials, are widely available. Metal beads and magnetic particles, particularly having coatings such as with polymeric materials, and especially preferred. Examples of commercially available microspheres are tabulated in Table 1 below:

TABLE 1

Examples of Commercially Available Microspheres
For Use As Floating Elements

| Microsphere Supplier | Material(s) | Size(s) |
| --- | --- | --- |
| Polymer Systems AS (Lillestrøm, Norway) | Polystyrene | 10–550 microns |
| | Crosslinked acrylics | 15 micron |
| Structure Probe, Inc. (West Chester, PA) | Polystyrene-DVB (crosslinked) | 5–20 micron |
| | Glass | 2–2000 micron |
| Duke Scientific Corporation (Palo Alto, CA) | Polystyrene-DVB (crosslinked) | 3–220 micron |
| | Nickel spheres (unsieved) | 3–24 micron |
| Bangs Laboratories (Fishers, IN) | Poly(methyl methacrylate) | 1–100 micron |
| | Polystyrene | 1–25 micron |
| | Carboxylate-modified polystyrene | 1–10 micron |
| | Amine modified polystyrene or methacrylate | 3–9 micron |
| | Magnetic polystyrene | 1 micron |
| | Silica | 1–6 micron |
| | Carboxylate modified silica | 1–3 micron |
| Interfacial Dynamics Corporation (Portland, OR) | Polystyrene with various surface chemistries (i.e., sulfate, amidine, carboxyl, etc.) | 1–10 micron |
| Dynal Particles AS (Lillestrøm, Norway) | Polystyrene | 2–30 micron |
| | Poly(vinyl toluene) | 2–3 micron |
| | Magnetic polymer beads with various surface chemistries | 3–5 micron |

Two different operational states of the fluidic device 10 are illustrated in FIGS. 1C–1D. FIG. 1C provides a cross-sectional view of a portion of a microfluidic flow control device in an un-activated or open position. Fluid flows into the channel 23 and enlarged region 24 adjacent to the floating element 22. With the floating element 22 resting on the sixth layer 16, a fluid flow path through the small aperture 21 is open, thus permitting fluid to flow into the enlarged chamber region 19, channel 18, and the outlet port 17. Notably, the floating element 22 remains localized within the chamber formed by the large aperture 21 and enlarged chamber region 24 because the height of the fifth layer 15 and associated chamber region 24 is smaller than the diameter of the floating element 22. That is, the diameter of the floating element was selected so that it is greater than the thickness of the fourth layer 14 but smaller than the combined thickness of the fourth and fifth layers 14, 15. This permits the device 10 to be handled and moved freely without worry of the floating element 22 being lodged in an undesirable position.

A second operational state of the fluidic device 10 is illustrated in FIG. 1D. There, the device 10 is in an activated or closed position, where the floating element 22 has moved into contact with a sealing surface 21A (i.e., the lower portion of the third layer 13 along the small aperture 21) to prevent fluid flow into the channel 18. Movement of the floating element 22 into contact with the sealing surface 21A may be caused by fluid flow. At low fluid flow rates and pressures, movement of the fluid past the microstructure 22 does not apply sufficient force to move the floating element 22 and the small via 20 remains unobstructed. As the flow rate increases, however, the fluid applies an upward force on the floating element 22, moving the floating element 22 upward into contact with the sealing surface—namely, the third layer 13 along the small aperture 20. The diameter of the aperture 20 in the third layer 20 is smaller than the diameter of the floating element 22 so that the a portion of the floating element 22 can fit into the aperture 20 against the sealing surface 21A and block fluid movement. Once the fluid pressure is lowered, the floating element bead can separate (e.g., descend) away from the sealing surface 21A, thus permitting flow to be re-established.

Alternatively, the position of the floating element 22, and thus, the operating state of the flow control device 10, may be altered or controlled by applying a magnetic field. Such an embodiment requires the floating element 22 to be composed at least in part from a magnetic material, as described previously. A magnetic field may be applied to drive the magnetic floating element 22 upward and into the small via 20 to engage the sealing surface 21A, thus blocking a fluid flow path through the via 20, as shown in FIG. 1D. External actuation permits the flow control device 10 to be activated even at very low fluid flow rates. In another operational state, a magnetic field may be applied in the opposite direction to cause the flow control device 10 to remain open even at higher fluid flow rates. When the pressure driving the fluid flow applies a force in one direction to the floating element 22 that exceeds the magnetic force applied in an opposite direction, then movement of the floating element 22 will again be controlled by fluid pressure.

In another embodiment, a device 10 like the one shown in FIGS. 1A–1D may be constructed, but used in an upside-down configuration. In this example, the fluid flow path through the channel network, namely through small via 20, is closed in the inactive position and fluid pressure or application of a magnetic field is required to open a flow path through the channel network. Such an inverted device 10 can also be used as a passive check valve to allow fluid flow in one direction but substantially disallow flow in the other direction. In this configuration, the floating element 22 normally rests upon the sealing surface 21A, having at least a portion of the floating element 22 within the aperture 20, thus preventing fluid flow through the device 10. When fluid is injected into the channel 18 and enlarged chamber region 19, this fluid force pushes the floating element 22 away from the sealing surface 21A, thus opening a fluid flow path through the aperture 21. However, when fluid is injected through into port 25 and the channel 23, the fluid force pushes the floating element 22 more tightly against the sealing surface 21A. So configured, the microfluidic flow control device 10 can act as a one-way valve allowing fluid to flow in a single direction only.

In another preferred embodiment, multiple microfluidic floating element flow control regions can be connected by a network of microfluidic channels to form a multiplexed flow control device. Further, such a multiplexed flow control device may be combined with a magnetic actuator array used to control various flow control regions to form a multiplexed microfluidic flow control system. For example, referring to FIG. 2B, a multiplexed flow control system 30 includes a magnetic field generator array 45 and a multiplexed flow control device 40 having nine individually controlled microfluidic floating element flow control regions 41 connected with a microfluidic channel network 42. Inlet and outlet ports 43, 44 permit one or more fluids to be supplied to or from the microfluidic channel network 42. The individual flow control regions 41 can be controlled using an array 45 of electromagnetic actuators 46, with each actuator 46 described previously in connection with FIG. 2A. Each actuator 46 includes a wire coil 48, preferably wrapped around a ferromagnetic field concentrating element or core 47. When current is passed through the coil 48, a magnetic field is generated in the direction of the core. This current can be generated in a variety of means, such as with a battery or current source 49. When the current is reversed, the magnetic field generated has the opposite polarity. The electromagnetic actuators 46 can be individually switched on and off by a controller 50, which may include a simple switching circuit or a more sophisticated control mechanism. Preferably, the controller is electronic; more preferably, the controller includes a programmable microprocessor for executing user-defined commands. In a preferred embodiment, the magnets are individually controlled. The array 45 is brought into close proximity to the microfluidic device 40 so that the magnetic field generated by each field generator 46 controls a different individual floating element flow control region 41.

The multiplexed flow control system 30 can be applied to various uses. For example, after fluid is injected through an inlet port 43 into the flow control device 40, selective activation of particular flow control regions 41 can provide a desired fluid pathway between the inlet port 43 and the outlet port 44. A multiplexed flow control system 30 permits such a fluid pathway to be altered very rapidly and reversibly with an electronic control system.

A microfluidic flow control system may include numerous other components. For example, referring to FIG. 8, a microfluidic flow control system 200 includes a flow control device 202 having multiple floating element flow control regions. A field generator array 205 having multiple magnetic field generators 206 is positioned in close proximity to the flow control device 202 to provide actuation of floating element flow control regions. One or more fluids may be supplied to the device 202 from fluid reservoirs 208, 209. A pumping subsystem 210 may be provided to pressurize the fluid(s), although in an alternative embodiment a vacuum pump (not shown) may be provided to draw fluid through the microfluidic flow control device 202. One or more external valves (not shown) may be associated with the pumping subsystem if necessary. At the outlet of the flow control device 202, a fluid processing element 212 may be used to separate or otherwise process effluent from the flow control device 202 before either: (a) recirculating the fluid(s) to the fluid reservoir(s) 208, 209; (b) diverting the fluid(s) to a sample collection element 214; or (c) routing the fluid(s) to a drain 215.

Control of the flow control system 200 is preferably provided with a controller 220. The controller 220 is preferably electronic, and more preferably microprocessor-based. Other controller types may be used. The controller 220 may be programmed to execute complex, sequential or repetitive fluid functions on the flow control device 202. The controller 220 preferably includes an associated power source 225. One or more sensors 222 may be in sensory communication with the microfluidic flow control device 202 and coupled to the controller 220 to provide feedback and/or sensory data to be stored in or otherwise used by the controller 220. The controller 220 may further control the pumping subsystem 210 with the aid of one or more associated sensors 224 to provide additional specific feedback and/or sensory data. An input device 226 and display 228 may be coupled to the controller 220 to aid with programming operational routines and processing sensor data, among other functions.

In another embodiment, a floating element for use in a microfluidic flow control device may be shaped like a disk. For example, referring to FIGS. 3A–3D, a microfluidic flow control device 60 is fabricated in six layers 61–66 with a sandwiched stencil construction method. The first layer 61 serves as a cover and defines first fluidic port 68. The second stencil layer 62 defines a channel 69 in fluid communication with the first port 68. The third layer 63 defines two vias 70, 71 in fluid communication with the channel 69 in the second layer 62. The fourth stencil layer 64 defines a channel 73 having an enlarged chamber region 74. The fifth stencil layer 65 defines an identical channel 75 having an enlarged chamber region 76. Notably, because the fourth and fifth layers 64, 65 have the same layout, they may be combined in a single layer of appropriate thickness to permit substantial movement of the floating element within the resulting chamber 67. The sixth layer 66 defines a second fluidic port 77. The second port 77 may lead to another region within a larger microfluidic device or may lead to an off-board region. During construction of the device 60, a floating element 72 shaped like a disk is placed into and contained within the chamber 67.

While the layers 61–66 could be fabricated from various materials of varying thicknesses, one example including specific materials follows. The first and third layers 61, 63 may be fabricated from 2 mil (50 microns) thick polypropylene film; the second and fourth layers 62, 64 may be fabricated from 5.4 mil (135 microns) thick double-sided tape comprising a 1 mil (2.5 microns) polyester carrier and 2.2 mil (27 microns) thick acrylic adhesive on each side; the fifth layer 65 may be fabricated from 6.8 mil (170 microns) thick single-sided tape comprising a 5 mil (125 microns) polyethylene carrier and 1.8 mil (45 microns) thickness acrylic adhesive; and the sixth layer 66 may be fabricated from a substrate of convenient dimensions. The sizes of the floating element 72, the layers 64, 65, and the chamber regions 73, 75 are selected to permit the floating element 72 to move freely within the combined chamber regions 73, 75. The floating element 72 should be shorter than the height of the chamber 67 (i.e., the combined thickness of the layers 64, 65) and larger in diameter than the fluidic outlet port 77 it is intended to selectively block. If the fluidic outlet port 77 is approximately 10 mils (250 microns) in diameter and the chamber regions 74, 76 are each approximately 50 mils (1.25 mm) in diameter, than an appropriately sized floating element may be a disc approximately 40 mils (1 mm) in diameter and approximately 10 mils (250 microns) thick.

Two different operating states of the device 60 are illustrated in FIGS. 3C–3D. An actuator such as a magnetic field generator 79 is positioned in close proximity to the device 60. FIG. 3C shows the device 60 in an open position, thus opening a fluid pathway permitting fluid in the upper channel 69 to flow past the floating element 72 and exit through the fluid port 72. This open position may be achieved by activating the magnetic field generator 79 to generate an attractive magnetic field, thus drawing the magnetic floating element 72 upward. When the magnetic field is removed, such as shown in FIG. 3D, the floating element 72 descends under the force of gravity to contact the sealing surface 78, thus covering the outlet port 47 and blocking fluid flow. The microfluidic device 60 thus acts as normally closed valve. Sealing between the floating element 72 and the sealing surface 78 is further enhanced by any fluid pressure supplied through the inlet port 68 and channel 69, since such pressure exerts a further downward force against the floating element 72.

In further preferred embodiments, a floating element microfluidic device may be used to divert fluid between multiple channels, thus switching fluid flow from one fluid pathway to another. For example, referring to FIGS. 4A–4D, a microfluidic flow control device 80 capable of switching between two exit channels 93, 104 may be constructed with a stencil fabrication method in nine layers 81–89. The first layer 81 defines a first fluid port 90 that leads to a via 92 defined in the second stencil layer 82, and also defines a second fluid port 91 in fluid communication with a channel 93 defined in the second stencil layer 82. The third layer 83 defines two vias 94, 95. The fourth stencil layer 84 defines a via 96 and a chamber region 97. The fifth stencil layer 85 defines a channel 98 terminating at an enlarged chamber region 99. The sixth stencil layer defines a chamber region 102 aligned with the chamber regions 97, 99. A small via 103 is defines in the seventh layer 87 below the chamber region 102. This via 103 leads to a channel 104 defined in the eighth stencil layer 88, which in turn leads to a fluid port 105 defined in the ninth layer 89. As the device 80 is constructed, a floating element 100 is placed into and contained within the chamber regions 97, 99, 102. While the floating element 100 illustrate in FIG. 4A is substantially spherical in shape, floating elements of other shapes may be used.

While various materials may be used for the layers 81–89 of the device 80, one example providing specific materials follows. The first, third, and seventh layers 81, 83, 87 may be fabricated from 2 mil (50 micron) thick polypropylene film; the second, fifth, and eighth layers 82, 85, 87 may be fabricated from 5.4 mil (135 microns) thick double-sided tape comprising a 1 mil (2.5 microns) polyester carrier and 2.2 mil (27 microns) thick acrylic adhesive on each side; the fourth and sixth layer 84, 86 may be fabricated from 6.8 mil (170 microns) thick single-sided tape comprising a 5 mil (125 microns) polyethylene carrier and 1.8 mil (45 microns) thickness acrylic adhesive; and the ninth layer 89 may be fabricated from a substrate of convenient dimensions. The floating element 100 should be smaller than both the height and diameter of the chamber 101 formed by stacking chamber regions 97, 99, 102, yet the floating element should be larger than the vias 95, 103. Accordingly, if the floating element 100 is approximately 15 mils (375 microns) in diameter, then an appropriate chamber height (i.e. the combined thickness of layers 84–86) and diameter would be approximately 19–20 mils (475–500 microns) and the vias 95, 103 may be approximately 10 mils (250 microns) in diameter. Other appropriate sizes may be selected and used.

The floating element 100 is preferably magnetic or magnetizable to respond to an applied magnetic field. In use, one or more field generators or actuators 105 apply a magnetic field to the device 80, causing the floating element 100 to move within the chamber 101. Fluid may be injected into the device 80 through the inlet port 90 and into the channel 98. When a magnetic field of one polarity is applied, the floating element 100 moves downward to contact the sealing surface 87A and block the via 103, thus preventing fluid from flowing into the lower channel 95. This diverts any fluid flow from the channel 98 through the via 95 and into the upper channel 93, as shown in FIG. 4C. If a magnetic field of the opposite polarity is applied, then the floating element 100 moves upward to contact the sealing surface 83A and block the via 95, thus preventing fluid from flowing into the channel 93. This diverts any fluid flow from the channel 98 through the via 103 and into the lower channel 95. FIG. 4D provides a simplified three-dimensional view of the flow control region with the floating element 100 disposed between the third and seventh layers 83, 87 in the chamber 101.

In another preferred embodiment, a microfluidic device having an integral floating element may be used to provide flow regulation utility. For example, referring to FIGS. 5A–5E, a microfluidic flow control device 110 is fabricated in seven layers 111–117 using a sandwich stencils construction method. The first layer 111 defines a first fluidic port 118 that leads to a channel 120 defined in the second stencil layer 112. The third layer 113 defines a via 121 that provides a fluid pathway between the channel 120 and a chamber region 122 defined through the entire thickness of the fourth stencil layer 114. The fifth layer 115 defines a via 125 aligned with the chamber region 122. The via 125 leads to a channel 126 defined in the sixth stencil layer 116, which channel 126 in turn leads to a second fluidic port 127 defined in the seventh layer 117. During construction of the device 110, a floating element 124 is placed into and contained within the chamber region 122.

Figure 5D:
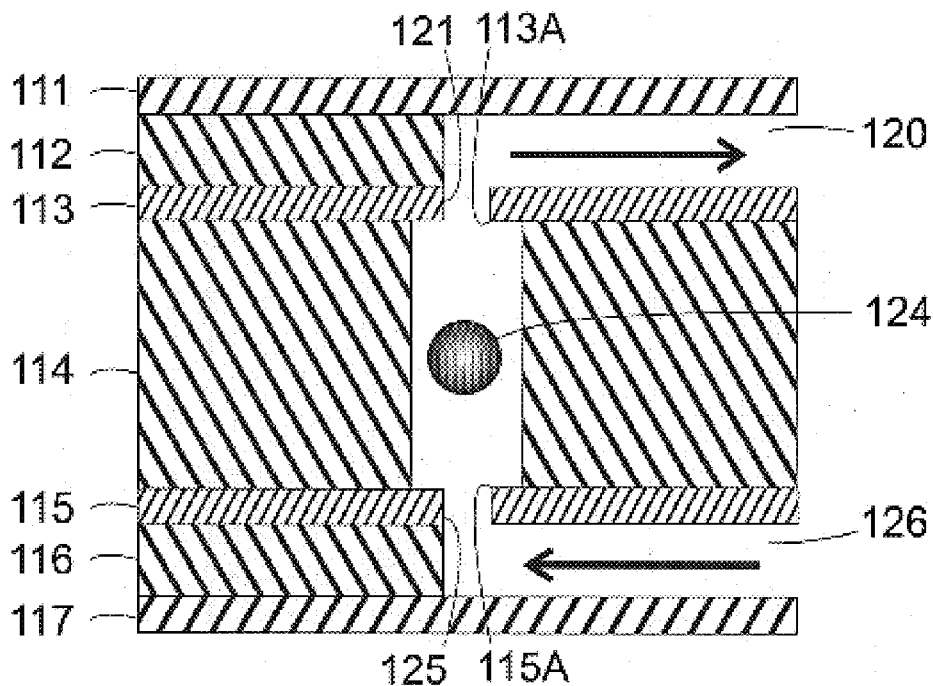

Three different operational states of the device 110 are shown in FIGS. 5C–5E. Notably, the device 110 may be used with or without external actuation means. In the absence of any fluid flow or any applied force that would tend to force the floating element 124 upward, gravity draws the floating element 124 into contact with the lower sealing surface 115A to cover the via 125, as shown in FIG. 5C. In use, fluid may be injected into the device 110 through the port 127 and into the lower channel 126. When the fluid pressure rises sufficiently to overcome the force of gravity, the floating element 124 will rise away from the sealing surface 115A to float within the chamber 122, thus permitting fluid to flow through the lower via 125, through the chamber 122 past the floating element 124, through the upper via 121, and into the upper channel 120 as shown in FIG. 5D. As the fluid pressure increases even further, the floating element 124 is pushed farther upward to ultimately contact the upper sealing surface 113A, thus blocking fluid flow through the upper via 121 as shown in FIG. 5E. Operation of the device 110 is thus analogous to a bandpass filter—allowing a "band" of fluid pressures to pass through, but disallowing fluid flow at pressures that are either too high or too low. Fluid flow through the device 110 is allowed above a first threshold fluid pressure but disallowed above a second threshold fluid pressure. The working parameters or pressure thresholds of the device for the various operational states can be tailored for particular applications by selecting or adjusting the size and mass of the bead 22, and the shapes and sizes of the chamber 122 and vias 121, 125. As noted previously, the device 110 may also be externally activated such as by using a magnetic floating element in conjunction with one or more magnetic field generators (not shown) to provide different operational characteristics. Other actuation means such as optical tweezers may also be used.

Multiple interconnected flow control regions according the design of FIGS. 5A–5E may be integrated into a single flow control device or flow control network. Flow control elements within such a multi-region device or network may be moved fluid pressure (passively) or an external (active) actuation means such as a magnetic field generator array. Since individual fluid control regions may be separately "tuned" to permit fluid flows specific pressure ranges, a passively "programmable" fluid network may be created. In other words, such a network permits fluid to traverse a fluid network through different flow paths depending solely on the pressure of the fluid, without requiring external actuation.

One example of specific materials that might be used to fabricate the device 100 follows. The first, third, fifth, and seventh layers 111, 113, 115, 117 may be fabricated from 2 mil (50 microns) thick polypropylene film; the second and sixth layers 112, 116 may be fabricated from a 5.4 mil (135 microns) thick double-sided tape comprising a 1 mil (2.5 microns) polyester carrier and 2.2 mil (27 microns) thick acrylic adhesive on each side; and the fourth layer 114 may be fabricated from a suitably thick substrate (e.g., polycarbonates, polypropylenes, or acrylics, among other possible materials). The floating element 124 may be fabricated from various magnetic or non-magnetic materials, as noted in the preceding Table. The floating element 124 should be diametrically smaller than the height or diameter of the chamber 122, yet larger than the vias 121, 125 that it is intended to periodically block. Examples of specific dimensions that might be used are: a 50 mil (1.25 mm) diameter for the floating element, 70 mils (1.75 mm) diameter by 100 mils (2.5 mm) height for the chamber 122, and 25 mils (625 microns) diameter for the vias 121, 125.

In another preferred embodiment, a floating element may be moved laterally within a microfluidic device to affect fluid flow therethrough. For example, referring to FIGS. 6A–6D, a microfluidic device 140 may be fabricated in five layers 140–144 with a sandwiched stencil construction method. The first layer 141 defines a first port 146 and a second port 147. These ports 146, 147 lead to channels 148, 149 defined in a second stencil layer 142. Vias 150, 151 are defined in a third layer 143. The fourth stencil layer 144 defines a channel 153, and a fifth layer 145 defines a third fluid port 154. An elongated floating element 152 is placed into the channel 153 during construction of the device 140. The floating element 152 may be fabricated in various shapes including regular prismatic shapes akin to a miniaturized 'brick'. If the floating element 152 is made from magnetic materials, then its movement may be controlled by one or more magnetic field generators external to the device 140.

Cross sectional views illustrating operation of the device 140 are provided in FIGS. 6C 6D. In FIG. 6C, an unobstructed flow path between the flow path between the inlet port 154 and the channel 149 is established through via 151, as depicted by the illustrated arrow. Depending on the proximity of the floating element 152 to the first sealing surface 143A, some fluid flow may or may not be permitted through the via 150. With a substantially unobstructed flow path through the other via 151, however, fluid flow through the device 140 will be biased toward the via 151. Application of a lateral actuating force moves the floating element 152 toward the sealing surface 143B and the via 151. The actuating force may further have a vertical component, if desired, to draw the floating element into sealing contact with the sealing surface 143 to prevent any fluid flow to the channel 149, as shown in FIG. 6D. In such an instance, fluid injected into the device through port 154 will flow exclusively through the via 150 into the channel 148.

One non-limiting example of specific materials that may be used to fabricate a device 140 according to FIGS. 6A–6D follows. The first layer 141 may be fabricated from a substrate (e.g., polycarbonates, polypropylenes, or acrylics, among other possible materials) of desired thickness; the second and fourth layers 142, 144 may be fabricated from 5.4 mil (135 microns) thick double-sided tape comprising a 1 mil (2.5 microns) polyester carrier and 2.2 mil (27 microns) thick acrylic adhesive on each side; and the third and fifth layers 143, 145 may be fabricated from 2 mil (50 microns) thick polypropylene film. If the channel 153 is approximately 40 mils (1 mm) wide and 5.4 mils (135 microns) high, the floating element 142 may be approximately 35 mils (875 microns) wide, 4.5–5 mils (112–125 microns) high, and of any suitable length long enough to block or obstruct one of the vias 150, 151 (e.g., 100 mils or 2.5 mm). The vias 150, 151 may be approximately 20 mils (500 microns) in diameter.

In further embodiments, microfluidic floating element flow control devices may be fabricated using surface micromachining techniques such as those used for fabricating silicon devices. For example, etching techniques may be employed. Representative device materials in these embodiments include silicon, silicon nitride, glass, or quartz. An example of such a device constructed with surface micromachining techniques is illustrated in FIGS. 7A–7C. A flow control device 159 is constructed from three substrates 160, 161, 162. The first substrate 160 defines two fluid ports 163, 164 that may be defined using methods such as etching or drilling. The second substrate 161 defines a first channel 165 micromachined into its upper surface. An via 167 penetrates from the bottom of the channel 165 to the lower surface of the second substrate 161. A via 166 is further defined through the entire thickness of the second substrate 161. The third substrate 162 defines a second channel 168 micromachined into its upper surface, the channel 168 permitting fluid communication with the vias 166, 167. A floating element 169 such as a spherical bead may be placed into the second channel 168 during fabrication of the device 159.

In operation, fluid can flow from one fluid port 163 through the device 159 to the other fluid port 164 whenever the floating element 159 does not sealingly engage the sealing surface 161A. Application of an appropriate actuation force such as a magnetic field can move the floating element 159 into contact with the sealing surface 161A, thus blocking fluid flow through the via 167. As mentioned previously, other actuation means may be used.

Floating elements described herein can be placed into microfluidic structures in different ways. In one embodiment, a microfluidic device according to the present invention is constructed in two parts. For example, referring again to FIG. 1A, layers 11–13 may be assembled together and layers 14–16 separately assembled. The bead or floating element 22 can then be placed in the chamber area 26 using a variety of techniques, including but not limited to manual placement or using automated pick-and-place equipment. When a multitude or array of floating elements such as beads are to be used in a single device, such as shown in FIG. 2B, multiple appropriately-sized beads can simply be spread across the surface of the first microfluidic sub-system and one bead will fall into each well. Beads also can be distributed using a fluid handling system, such as is commonly used to fill multi-well titer plates. Further layers of a device can then be bonded to the lower portion, completing construction of the device.

In all of the above-described embodiment, devices may be constructed to provide reversible flow blocking and/or diverting utility. Namely, when the actuation force that moves the micro-structure is removed, the devices may returns to its inactive state. The previously-described embodiments can be constructed open in the inactive state (normally open) or open in the activated state (normally closed). Flow control devices according to the present invention can be constructed to be single use or 'irreversible' valves. In such an embodiment, for example, the sealing surface can be coated with an adhesive to provide a permanent or semi-permanent seal between the floating element and the surrounding microfluidic device.

The particular devices and construction methods illustrated and described herein are provided by way of example only, and are not intended to limit the scope of the invention. The scope of the invention should be restricted only in accordance with the appended claims and their equivalents.

What is claimed is:

1. A microfluidic flow control device comprising:
   a fluidic chamber having an associated first microfluidic channel, an associated second microfluidic channel, and at least one sealing surface disposed between the first channel and the second channel; and
   a floating element disposed within the chamber, the floating element capable of intermittently engaging the at least one sealing surface;
   wherein movement of the floating element affects fluid flow between the first microfluidic channel and the second microfluidic channel.

2. The microfluidic flow control device of claim 1 wherein the device is fabricated from multiple layers, the first microfluidic channel being defined in a first device layer and the second microfluidic channel being defined in a second device layer.

3. The microfluidic flow control device of claim 2 wherein the first device layer and the second device layer are stencil layers, the first channel being defined through the entire thickness of the first device layer and the second channel being defined through the entire thickness of the second device layer.

4. The microfluidic flow control device of claim 2, further comprising a third device layer disposed between the first device layer and the second device layer, wherein the third device layer defines at least a portion of the sealing surface.

5. The microfluidic flow control device of claim 1 wherein the at least one sealing surface defines an aperture that is smaller than at least one dimension of the floating element.

6. The microfluidic flow control device of claim 1 wherein the floating element is substantially non-porous.

7. The microfluidic flow control device of claim 1 wherein the floating element moves in response to a pressure differential within the device.

8. The microfluidic flow control device of claim 1 wherein the floating element moves in response to an applied external force.

9. The microfluidic flow control device of claim 8 wherein the external force is a magnetic field.

10. The microfluidic flow control device of claim 1 wherein the floating element is substantially spherical in shape.

11. The microfluidic flow control device of claim 1 wherein the floating element is fabricated with a magnetic or magnetizable material.

12. The microfluidic flow control device of claim 1, further comprising a third microfluidic channel associated with the fluidic chamber, wherein movement of the floating element selectively diverts fluid flow from the first channel to either the second channel or the third channel.

13. The microfluidic flow control device of claim 2 wherein any of the first channel or the second channel are surface micromachined.

14. The microfluidic flow control device of claim 1 wherein fluid flow is permitted in one direction through the flow control device, but is substantially blocked in the opposite direction.

15. The microfluidic flow control device of claim 1 wherein fluid flow through the device is allowed above a first threshold fluid pressure but disallowed above a second threshold fluid pressure.

16. A microfluidic flow control system comprising a plurality of interconnected microfluidic flow control devices according to claim 15.

17. A microfluidic flow control system comprising:
   a microfluidic flow control device according to claim 9;
   at least one magnetic actuator to generate a magnetic field; and
   a controller coupled to the at least one magnetic actuator.

18. The microfluidic flow control system of claim 17, further comprising at least one field concentrating element.

19. The flow control system of claim 17 wherein the controller is programmable.

* * * * *

UNITED STATES PATENT AND TRADEMARK OFFICE
CERTIFICATE OF CORRECTION

PATENT NO. : 6,739,576 B2
DATED : May 25, 2004
INVENTOR(S) : O'Connor, Stephen D. et al.

It is certified that error appears in the above-identified patent and that said Letters Patent is hereby corrected as shown below:

Column 17,
Line 42, claim 1, should read
1. A microfluidic flow control device comprising:
   a fluidic chamber having an associated first microfluidic channel, an associated second microfluidic channel, and at least one sealing surface disposed between the first channel and the second channel; and
   a floating element disposed within the chamber, the floating element capable of intermittently engaging the at least one sealing surface;
   wherein movement of the floating element affects fluid flow between the first microfluidic channel and the second microfluidic channel;
   wherein the device is fabricated from multiple layers, the first microfluidic channel being defined in a first device layer and the second microfluidic channel being defined in a second device layer.
Lines 44-48, original claim 2 has been canceled.
Line 49, cancel the text beginning with "3. The microfluidic flow" to and ending "second device layer." and insert the following claim:
2. The microfluidic flow control device of claim 1 wherein the first device layer and the second device layer are stencil layers, the first channel being defined through the entire thickness of the first device layer and the second channel being defined through the entire thickness of the second device layer.

Column 18,
Line 1, cancel the text beginning with "4. The microfluidic flow" to and ending "the sealing surface." and insert the following claim:
3. The microfluidic flow control device of claim 1, further comprising a third device layer disposed between the first device layer and the second device layer, wherein the third device layer defines at least a portion of the sealing surface.
Line 5, cancel the text beginning with "5. The microfluidic flow" to and ending "the floating element." and insert the following claim:
4. The microfluidic flow control device of claim 1 wherein the at least one sealing surface defines an aperture that is smaller than at least one dimension of the floating element.
Line 8, cancel the text beginning with "8. The microfluidic flow" to and ending "substantially non-porous." and insert the following claim:
5. The microfluidic flow control device of claim 1 wherein the floating element is substantially non-porous.
Line 10, cancel the text beginning with "7. The microfluidic flow" to and ending "within the device." and insert the following claim:
6. The microfluidic flow control device of claim 1 wherein the floating element moves in response to a pressure differential within the device.

UNITED STATES PATENT AND TRADEMARK OFFICE
CERTIFICATE OF CORRECTION

PATENT NO. : 6,739,576 B2
DATED : May 25, 2004
INVENTOR(S) : O'Connor, Stephen D. et al.

It is certified that error appears in the above-identified patent and that said Letters Patent is hereby corrected as shown below:

Column 18 (cont'd),
Line 13, cancel the text beginning with "8. The microfluidic flow" to and ending "external force." and insert the following claim:
7. The microfluidic flow control device of claim 1 wherein the floating element moves in response to an applied external force.
Line 16, cancel the text beginning with "9. The microfluidic flow" to and ending "magnetic field." and insert the following claim:
8. The microfluidic flow control device of claim 7 wherein the external force is a magnetic field.
Line 18, cancel the text beginning with "10. The microfluidic flow" to and ending "spherical in shape." and insert the following claim:
9. The microfluidic flow control device of claim 1 wherein the floating element is substantially spherical in shape.
Line 21, cancel the text beginning with "11. The microfluidic flow" to and ending "magnetizable material." and insert the following claim:
10. The microfluidic flow control device of claim 1 wherein the floating element is fabricated with a magnetic or magnetizable material.
Line 24, cancel the text beginning with "12. The microfluidic flow" to and ending "the third channel." and insert the following claim:
11. The microfluidic flow control device of claim 1, further comprising a third microfluidic channel associated with the fluidic chamber, wherein movement of the floating element selectively diverts fluid flow from the first channel to either the second channel or the third channel.
Line 29, cancel the text beginning with "13. The microfluidic flow" to and ending "micromachined." and insert the following claim:
12. The microfluidic flow control device of claim 1 wherein any of the first channel or the second channel are surface micromachined.
Line 32, cancel the text beginning with "14. The microfluidic flow" to and ending "opposite direction." and insert the following claim:
13. The mircrofluidic flow control device of claim 1 wherein fluid flow is permitted in one direction through the flow control device, but is substantially blocked in the opposite direction.
Line 36, cancel the text beginning with "15. The microfluidic flow" to and ending "fluid pressure." and insert the following claim:
14. The microfluidic flow control device of claim 1 wherein fluid flow through the device is allowed above a first threshold fluid pressure but disallowed above a second threshold fluid pressure.

UNITED STATES PATENT AND TRADEMARK OFFICE
CERTIFICATE OF CORRECTION

PATENT NO. : 6,739,576 B2
DATED : May 25, 2004
INVENTOR(S) : O'Connor, Stephen D. et al.

It is certified that error appears in the above-identified patent and that said Letters Patent is hereby corrected as shown below:

Column 18 (cont'd),
Line 40, cancel the text beginning with "16. The microfluidic flow" to and ending "to claim 15." and insert the following claim:
15. A microfluidic flow control system comprising a plurality of interconnected microfluidic flow control devices according to claim 14.
Line 43, cancel the text beginning with "17. The microfluidic flow" to and ending "magnetic actuator." and insert the following claim:
16. A microfluidic flow control system comprising:
    a microfluidic flow control device according to claim 8;
    at least one magnetic actuator to generate a magnetic field; and
    a controller coupled to the at least one magnetic actuator.
Line 48, cancel the text beginning with "18. The microfluidic flow" to and ending "concentrating element." and insert the following claim:
17. The microfluidic flow control system of claim 16, further comprising at least one field concentrating element.
Line 50, cancel the text beginning with "19. The flow control system" to and ending "programmable." and insert the following claim:
18. The flow control system of claim 16 wherein the controller is programmable.

Signed and Sealed this

Sixteenth Day of November, 2004

JON W. DUDAS
*Director of the United States Patent and Trademark Office*